US011990102B2

(12) United States Patent
Tsuchi

(10) Patent No.: US 11,990,102 B2
(45) Date of Patent: May 21, 2024

(54) DISPLAY APPARATUS AND DATA DRIVER

(71) Applicant: LAPIS Technology Co., Ltd., Yokohama (JP)

(72) Inventor: Hiroshi Tsuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/150,787

(22) Filed: Jan. 5, 2023

(65) Prior Publication Data

US 2023/0230556 A1 Jul. 20, 2023

(30) Foreign Application Priority Data

Jan. 14, 2022 (JP) ................................ 2022-004336

(51) Int. Cl.
*G09G 3/36* (2006.01)
*G09G 3/20* (2006.01)

(52) U.S. Cl.
CPC ......... *G09G 3/3685* (2013.01); *G09G 3/2096* (2013.01); *G09G 3/3614* (2013.01); *G09G 2310/08* (2013.01); *G09G 2320/0209* (2013.01); *G09G 2320/0247* (2013.01)

(58) Field of Classification Search
CPC ......... G09G 3/3614; G09G 2300/0823; G09G 2310/0254; G09G 2310/068; G09G 3/3685; G09G 3/2096; G09G 2310/08; G09G 2320/0209; G09G 2320/0247
See application file for complete search history.

(56) References Cited

U.S. PATENT DOCUMENTS 7,133,035 B2 * 11/2006 Kim ..................... G09G 3/3611 345/98
7,148,870 B2 * 12/2006 Tada .................... G09G 3/3614 345/98
7,391,399 B2 * 6/2008 Kikuchi ............... G09G 3/3648 345/204
7,683,870 B2 * 3/2010 Kang ................... G09G 3/2011 345/98
8,111,233 B2 * 2/2012 Arai ..................... G09G 3/3688 345/98

(Continued)

FOREIGN PATENT DOCUMENTS

JP 2002108288 4/2002

*Primary Examiner* — Michael J Jansen, II
(74) *Attorney, Agent, or Firm* — JCIPRNET

(57) ABSTRACT

In a first output mode, a signal in which a data pulse having a positive polarity voltage value appears in a predetermined cycle is output as a positive polarity gradation data signal, and a signal in which a data pulse having a negative polarity voltage value appears in the predetermined cycle with a phase different from the positive polarity gradation data signal is output as a negative polarity gradation data signal. In a second output mode, the above positive polarity gradation data signal is generated, and a signal in which a data pulse having a negative polarity voltage value appears in the predetermined cycle with the same phase as the positive polarity gradation data signal is output as the negative polarity gradation data signal. The first and second output modes are alternatively executed, and the output mode is switched within a predetermined period at intervals of the predetermined period.

11 Claims, 15 Drawing Sheets

(56) References Cited

U.S. PATENT DOCUMENTS 8,179,351 B2 * 5/2012 Song .................... G09G 3/3614 345/96
8,269,706 B2 * 9/2012 Hwang ................ G09G 3/3614 345/94
8,344,984 B2 * 1/2013 Min ..................... G09G 3/3648 345/99
8,368,635 B2 * 2/2013 Nakayama ........... G09G 3/3688 345/98
8,519,932 B2 * 8/2013 Lee ...................... G09G 3/3614 345/98
8,593,440 B2 * 11/2013 Bae ...................... G09G 3/3614 345/204
8,941,574 B2 * 1/2015 Kim ..................... G09G 3/3611 345/96
9,460,683 B2 * 10/2016 Jeong ................... G09G 3/3614
9,646,550 B2 * 5/2017 Kim ..................... G09G 3/3614
9,691,340 B2 * 6/2017 Liu ...................... G09G 3/3614
9,697,782 B2 * 7/2017 Liu ...................... G09G 3/3614
9,940,865 B2 * 4/2018 Maruyama ........... G09G 3/3614
9,972,257 B2 * 5/2018 Yang .................... G09G 3/3614
10,192,509 B2 * 1/2019 Lee ...................... G09G 3/3614
10,332,466 B2 * 6/2019 Cho ..................... G09G 3/3614
10,783,824 B2 * 9/2020 Hsu .......................... G09G 3/20
10,885,823 B2 * 1/2021 Kim ......................... G09G 3/20
10,902,815 B2 * 1/2021 Han ..................... G09G 3/3688
11,308,903 B2 * 4/2022 Liang ................... G09G 3/3685
11,398,202 B2 * 7/2022 Tsuchi .................. G02F 1/1368
11,810,527 B2 * 11/2023 Tsuchi ................. G09G 3/3685
2003/0142054 A1 * 7/2003 Tada .................... G09G 3/3648 345/87
2004/0239602 A1 * 12/2004 Kim ..................... G09G 3/3611 345/87
2005/0140630 A1 * 6/2005 Kikuchi ............... G09G 3/2011 345/89
2005/0200587 A1 * 9/2005 Hwang ................ G09G 3/3688 345/96
2006/0290638 A1 * 12/2006 Kang ................... G09G 3/3688 345/98
2007/0120804 A1 * 5/2007 Su ........................ G09G 3/3614 345/99
2008/0309607 A1 * 12/2008 Arai ..................... G09G 3/3688 345/99
2009/0179845 A1 * 7/2009 Song .................... G09G 3/3614 345/90
2010/0231564 A1 * 9/2010 Min ..................... G09G 3/3648 345/96
2010/0321353 A1 * 12/2010 Bae ...................... G09G 3/3614 345/205
2011/0037746 A1 * 2/2011 Kim ..................... G09G 3/3688 345/87
2011/0134092 A1 * 6/2011 Lee ...................... G09G 3/3688 345/209
2011/0216052 A1 * 9/2011 Tanaka ................. G09G 3/3688 345/209
2011/0242084 A1 * 10/2011 Nakayama ........... G09G 3/3614 345/212
2012/0146967 A1 * 6/2012 Kim ..................... G09G 3/3688 345/204
2012/0299884 A1 * 11/2012 Liu ...................... G09G 3/3614 345/204
2013/0100105 A1 * 4/2013 Furuta .................. G09G 3/3677 345/87
2013/0135267 A1 * 5/2013 Jeong ................... G09G 3/3688 345/204
2014/0043311 A1 * 2/2014 Shao .................... G09G 3/3611 345/96
2014/0176411 A1 * 6/2014 Yang .................... G09G 3/3614 345/96
2016/0180783 A1 * 6/2016 Liu ...................... G09G 3/3688 345/96
2016/0372022 A1 * 12/2016 Maruyama ........... G09G 3/2085
2016/0379579 A1 * 12/2016 Cho ..................... G09G 3/3614 345/214
2017/0256228 A1 * 9/2017 Lee ...................... G09G 3/3614
2019/0259348 A1 * 8/2019 Han ..................... G09G 3/3688
2019/0347972 A1 * 11/2019 Kim ......................... G09G 3/20
2020/0098311 A1 * 3/2020 Hsu ........................... G06F 1/06
2021/0035520 A1 * 2/2021 Tsuchi ................. G09G 3/3614
2021/0174755 A1 * 6/2021 Liang ................... G09G 3/3614
2022/0208136 A1 * 6/2022 Tsuchi ................. G09G 3/3685
2023/0010045 A1 * 1/2023 Tsuchi ................. G09G 3/3614
2023/0230556 A1 * 7/2023 Tsuchi ................. G09G 3/2096 345/209

* cited by examiner

[First output mode]

DISPLAY APPARATUS AND DATA DRIVER

CROSS-REFERENCE TO RELATED APPLICATIONS

This application claims the priority benefit of Japan Application No. 2022-004336, filed on Jan. 14, 2022. The entirety of the above-mentioned patent application is hereby incorporated by reference herein and made a part of this specification.

BACKGROUND

Technical Field

The disclosure relates to a display apparatus that displays an image according to a video signal, and a data driver included in the display apparatus.

Related Art

At present, many large-screen display apparatuses employ an active-matrix-driven liquid crystal panel as a display device.

In the liquid crystal panel, a plurality of data lines each extending in a vertical direction of a two-dimensional screen and a plurality of gate lines each extending in a horizontal direction of the two-dimensional screen are disposed intersecting each other. Furthermore, at each intersection of these data lines and gate lines, a pixel part including a pixel switch connected to the data lines and gate lines is formed. The pixel part includes a transparent electrode disposed independently for each pixel, a counter substrate on which one transparent electrode that covers the entire two-dimensional screen of the liquid crystal panel is formed, a liquid crystal material sealed between each transparent electrode of each pixel and the counter substrate, and a backlight.

A liquid crystal display includes, along with such a liquid crystal panel, a data driver and a gate driver. The data driver supplies a gradation data signal having an analog voltage value corresponding to a luminance level of each pixel to the data line by a data pulse in units of one horizontal scanning period. The gate driver applies a gate selection signal that switches the pixel switch on or off to each of the gate line.

In the liquid crystal display, when the pixel switch is switched on in response to the gate selection signal sent from the gate driver, the gradation data signal sent from the data driver is applied to the transparent electrode of the pixel part. Such an operation is hereinafter referred to as a voltage supply to the pixel part or a charge (including discharge) to the pixel part. On this occasion, depending on a potential difference between a voltage value of the gradation data signal applied to the transparent electrode corresponding to each pixel and a fixed voltage (referred to as counter substrate voltage) applied to a counter substrate electrode facing a transparent electrode group across a liquid crystal layer, a transmittance of the liquid crystal varies, and display corresponding to the gradation data signal is performed.

Furthermore, in the liquid crystal display, in order to prevent deterioration of the liquid crystal thereof, polarity inversion driving is performed in which a gradation data signal of positive polarity and a gradation data signal of negative polarity with respect to the counter substrate voltage are alternately supplied every predetermined frame period.

With the recent trends of large-screen and ultra-high resolution liquid crystal displays, a period length of one horizontal scanning period of a video signal is shortened, and a driving period per pixel, that is, a period (also referred to as one data period) during which a data line is supplied with a gradation data signal corresponding to one pixel, is also shortened. Accordingly, a charging period for a pixel is shortened. In particular, a pixel to which a positive polarity gradation data signal is supplied (charged) is more likely to be undercharged than a pixel to which a negative polarity gradation data signal is supplied (charged).

That is, the pixel switch included in each pixel is actually a thin film transistor. By a current driving capability corresponding to a potential difference between the gate selection signal applied to a control terminal of the pixel switch and the gradation data signal applied to a first terminal of the pixel switch, the gradation data signal is supplied to the pixel (transparent electrode) connected to a second terminal of the pixel switch. Thus, the smaller the potential difference between the gate selection signal and the gradation data signal, the lower the current driving capability of the pixel switch, and the slower the charging speed of the gradation data signal with respect to the pixel.

On this occasion, the positive polarity gradation data signal overall has a higher voltage than the negative polarity gradation data signal. Thus, a potential difference between the positive polarity gradation data signal and the gate selection signal is smaller than a potential difference between the negative polarity gradation data signal and the gate selection signal. Accordingly, within one data period, even if the pixel to which the negative polarity gradation data signal is supplied (charged) is properly charged, there is a risk that the pixel to which the positive polarity gradation data signal is supplied (charged) may be undercharged, and flicker or image quality deterioration may occur in a displayed image.

Accordingly, there has been proposed a liquid crystal driving method (see, for example, Patent Document 1) as follows. A driving method is adopted in which the polarity of a gradation data signal is inverted for each horizontal scanning line, and a period length of one horizontal scanning period for writing with a positive polarity gradation data signal is made longer than a period length of one horizontal scanning period for writing with a negative polarity gradation data signal, thereby solving the above problem.

With the trends of large-screen and ultra-high resolution liquid crystal displays, the one data period is shortened, and wiring resistance and wiring capacitance of a gate line and a data line are increased. Accordingly, larger rounding occurs at an edge of a pulse of the gate selection signal reaching a pixel disposed at a position having a long wiring length from an output terminal of a gate driver compared to a pixel disposed close to the output terminal. When a data line with a large potential difference due to polarity inversion is frequently charged and discharged, power consumption (heat generation) of the data driver increases.

Accordingly, in a large-screen and high-resolution liquid crystal panel, so-called column inversion driving (also referred to as column line inversion driving) is performed in which the polarity of a gradation data signal supplied to a data line is set to the same within a frame period, the polarity is made different between adjacent data lines, and the polarity of the gradation data signal supplied to each data line is inverted per frame period.

However, even in the case of performing column inversion driving, as described above, there is a risk that the pixel to which the positive polarity gradation data signal is supplied may be undercharged even if the pixel to which the negative polarity gradation data signal is supplied is properly charged.

FIG. 1 is a waveform diagram showing an example of waveforms of a positive polarity gradation data signal Vdx, a negative polarity gradation data signal Vd(x+1) and a gate selection signal Vgk. The positive polarity gradation data signal Vdx and the negative polarity gradation data signal Vd(x+1) are respectively applied to an X-th data line and an (X+1)-th data line of a display panel that are adjacent to each other, and the gate selection signal Vgk is applied to a gate line. In FIG. 1, a driving example is shown in which the first gate line closest to a data driver is GL1, an r-th gate line farthest from the data driver is GLr, and the gate selection signal is sequentially output from a gate driver from the gate line GLr to the gate line GL1. The positive polarity gradation data signal Vdx and the negative polarity gradation data signal Vd(x+1) output from the data driver also correspond to the selection order of the gate selection signal, in which a sequential output is started from gradation data pulses Dpr and Dnr supplied to the pixels in the r-th row, and gradation data pulses Dp1 and Dn1 supplied to the pixels in the first row are output at the end.

Here, the gradation data signal has an analog voltage value (gradation voltage) supplied to each pixel in a data line direction and is composed of a plurality of gradation data pulses in units of one data period. Each gradation data pulse of the positive polarity gradation data signal Vdx has a gradation voltage within a voltage range from a predetermined lower limit Lpy to an upper limit Lpz higher than Lpy on a high potential side of the counter substrate voltage (hereinafter referred to as counter substrate voltage VCOM). The negative polarity gradation data signal Vd(x+1) has a gradation voltage within a voltage range from a predetermined upper limit Lny to a lower limit Lnz lower than Lny on a low potential side of the counter substrate voltage VCOM. The counter substrate voltage is generally set between the lower limit Lpy of the positive polarity gradation data signal and the upper limit Lny of the negative polarity gradation data signal. In the drawings, for convenience of description, the gradation data pulses of the gradation data signals Vdx and Vd(x+1) exhibit a driving pattern in which the gradation voltages of the upper limit and the lower limit within the respective voltage ranges are alternately output every one data period.

The gate selection signal Vgk is a pulse signal applied to a k-th (k is an integer of 2 or more) gate line to be selected and transitioning from a predetermined low potential VGL to a high potential VGH. In the gate selection signal, waveform rounding occurs due to impedance (wiring resistance or wiring capacitance) corresponding to the wiring length of the gate line from the output terminal of the gate driver. FIG. 1 shows an example of the waveform of the gate selection signal Vgk observed at the position of a gate line intersecting the X-th and (X+1)-th data lines at positions where the wiring length from the output terminal of the gate driver is relatively long. In the example shown in FIG. 1, in order to increase pixel charging efficiency, the gate selection signal Vgk is maintained at the high potential VGH from a data period before the one data period during which a positive polarity gradation data pulse Dpk and a negative polarity gradation data pulse Dnk to be supplied to a pixel in the k-th row are output to the X-th and (X+1)-th data lines. Accordingly, as shown in FIG. 1, by gradation data pulses Dp(k+1) and Dn(k+1) immediately before the gradation data pulses Dpk and Dnk, a so-called gate precharge is performed in which the pixel in the k-th row to be selected is precharged.

Here, the positive polarity gradation data pulse Dpk and the negative polarity gradation data pulse Dnk (k is 1, 2, . . . , to r in both) are timing-controlled by the same clock signal CLK, and their respective phases are assumed to be the same. A phase timing of the gate selection signal Vgk and the gradation data pulses Dpk and Dnk is determined by a relationship between the lower limit Lnz of an amplitude of the negative polarity gradation data signal Vd(x+1) and the potential of the gate selection signal Vgk so that the selected pixel in the k-th row is not charged by the next gradation data pulses Dp(k−1) and Dn(k−1). In FIG. 1, the phase timing is adjusted so that, at the end of one data period T1H during which the gradation data pulse Dnk having the lower limit Lnz of the negative polarity gradation data signal Vd(x+1) is supplied, the gate selection signal Vgk falls below the lower limit Lnz.

Accordingly, an effective pixel charging period Tn1 of the negative polarity gradation data pulse Dnk is equivalent to the one data period T1H.

On the other hand, an effective pixel charging period Tp1 of the positive polarity gradation data pulse Dpk is determined by the gradation data pulse Dpk of the lower limit Lpy of a dynamic range of the positive polarity gradation data signal Vdx and the potential of the gate selection signal Vgk.

At this time, as shown in FIG. 1, the effective pixel charging period Tp1 by the positive polarity gradation data pulse Dpk is shorter than the one data period T1H by a period Ts1 due to rounding at a rear edge of the gate selection signal Vgk, and a pixel charging rate is reduced accordingly.

Furthermore, as described above, the potential difference between the gate selection signal Vgk and the gradation data signal also affects the pixel charging rate, and the pixel charging rate of the positive polarity gradation data signal Vdx is lower than the pixel charging rate of the negative polarity gradation data signal Vd(x+1) having a large potential difference.

Accordingly, a charging rate based on the positive polarity gradation data signal and a charging rate based on the negative polarity gradation data signal do not match, and a problem arises that flicker or image quality deterioration occurs in the displayed image.

On this occasion, if column inversion driving is performed, since the pixel supplied with the positive polarity gradation data signal and the pixel supplied with the negative polarity gradation data signal coexist along one horizontal scanning line, the method described in Patent Document 1 is unable to solve the above problem.

[Patent Document 1] Japanese Patent Laid-open No. 2002-108288

In performing column inversion driving, by delaying the phase of the negative polarity gradation data signal with respect to the positive polarity gradation data signal, a difference between the pixel charging rate by a gate selection signal with rounding at a rear edge and the negative polarity gradation data signal and a pixel charging rate by the gate selection signal and the positive polarity gradation data signal may be reduced.

However, when an image with a gray background that includes a relatively large white square area WE in the center of a screen, as shown in for example, FIG. 2, is displayed by such column inversion driving, a problem arises that streak unevenness (referred to as crosstalk) appears along an upper side and a lower side of the white square area WE.

A cause of such crosstalk will be described below with reference to FIG. 3.

FIG. 3 is a waveform diagram showing waveforms of data signals respectively sent to data lines Df and D(f+1) passing through the white square area WE shown in FIG. 2 and data lines Dg and D(g+1) not passing through the white square area WE as well as a voltage waveform of the counter substrate voltage VCOM while the gate selection signal is supplied to a gate line Ga along the upper side of the white square area WE. In the following, a case will be described where the liquid crystal material has a characteristic that the larger the voltage difference between the counter substrate voltage VCOM and each pixel electrode, the greater the liquid crystal transmittance (white display).

As shown in FIG. 3, in the data line Df, a level of the positive polarity gradation data signal rises from level Vp_gy representing gray to level Vp_wt representing white at time Tp; in the data line D(f+1), a level of the negative polarity gradation data signal falls from level Vn_gy representing gray to level Vn_wt representing white at time Tn when a predetermined period has elapsed from time Tp. As shown in FIG. 3, in the data line Dg not passing through the white square area WE, the positive polarity gradation data signal is maintained at level Vp_gy; in the data line D(g+1) not passing through the white square area WE, the negative polarity gradation data signal is maintained at level Vn_gy.

On this occasion, in the counter substrate voltage VCOM, due to capacitive coupling in the liquid crystal panel that corresponds to the voltage rise of the positive polarity gradation data signal applied to the data line Df and the voltage fall of the negative polarity gradation data signal applied to the data line D(f+1) as shown in FIG. 3, a large extensive voltage fluctuation occurs. The magnitude of the voltage fluctuation in the counter substrate voltage VCOM depends on a width of an edge of the white square area WE shown in FIG. 2 (the number of data lines in which a voltage change occurs at the edge of the white square area WE), or a difference in timing of changing to a voltage level representing white between the positive polarity gradation data signal and the negative polarity gradation data signal, or a speed of change in the voltage level (the magnitude of slew rate of a positive polarity and negative polarity output amplifier) or the like. The voltage fluctuation in the counter substrate voltage VCOM generated at the edge of the white square area WE also propagates within a panel surface to which the counter substrate electrode is connected. Accordingly, when a potential difference between the counter substrate electrode and a pixel electrode at an intersection of, for example, the data lines Dg and D(g+1) not passing through the white square area WE and the gate lines Ga and Gb is kept in a state deviating from an expected value, each pixel disposed along the gate lines Ga and Gb has a luminance different from that of the original gray background. For example, in FIG. 3, at the end of a 1H period selected by the gate line Ga, in a pixel to which the positive polarity gradation data signal of the data line Df is supplied, since the counter substrate voltage VCOM rises, a voltage (difference voltage between the gradation data signal and the counter substrate voltage VCOM) applied to the liquid crystal of the pixel is kept lower than the expected value for one frame period, and the luminance is lower than the expected value. In a pixel to which the negative polarity gradation data signal of the data line D(f+1) is supplied, since the counter substrate voltage VCOM rises, a voltage applied to the liquid crystal of the pixel is kept higher than the expected value for one frame period, and the luminance is higher than the expected value. However, since these pixels are located at a boundary where a color change occurs and are white with high luminance, a slight change in luminance due to a fluctuation in the counter substrate voltage VCOM cannot be visually recognized by humans. On the other hand, at the end of the 1H period selected by the gate line Ga, in a pixel to which the gradation data signal of the data line Dg not passing through the white square area WE is supplied, since the counter substrate voltage VCOM rises, a voltage applied to the liquid crystal of the pixel is kept lower than the expected value for one frame period, and the luminance is lower than the expected value. In a pixel to which the gradation data signal of the data line D(g+1) is supplied, since the counter substrate voltage VCOM rises, a voltage applied to the liquid crystal of the pixel is kept higher than the expected value for one frame period, and the luminance is higher than the expected value. In these pixels, due to occurrence of a luminance change of a certain level or more, there is a gap in cancellation of the luminance of each pixel of positive polarity and negative polarity in a non-linear gamma characteristic, and since the pixels are located in a gray display area for which human visual sensitivity is high, a difference in luminance of the pixels from the surroundings becomes easy to visually recognize. As a result, as shown in FIG. 2, streak unevenness along each of the gate lines Ga and Gb in the gray background may be visually recognized as crosstalk. If a large voltage fluctuation occurs in the counter substrate voltage VCOM and extends over a plurality of data periods, there is a possibility that each pixel along a gate line selected after the gate lines Ga and Gb may also have streak unevenness as crosstalk.

SUMMARY

A display apparatus according to the disclosure includes: a display panel, including a plurality of data lines including a first data line group and a second data line group, and a plurality of gate lines disposed intersecting the plurality of data lines; a gate driver, supplying a gate selection signal to each of the plurality of gate lines; and a plurality of data drivers, provided for each predetermined number of data lines, each generating a positive polarity gradation data signal higher than a predetermined standard voltage and a negative polarity gradation data signal lower than the standard voltage in response to a video signal, and alternately and repeatedly executing an operation of supplying the positive polarity gradation data signal to the first data line group and supplying the negative polarity gradation data signal to the second data line group and an operation of supplying the positive polarity gradation data signal to the second data line group and supplying the negative polarity gradation data signal to the first data line group. The data driver includes a control part. The control part executes either a first output mode or a second output mode, and switches from the first output mode to the second output mode or from the second output mode to the first output mode within a predetermined period at intervals of the predetermined period. In the first output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with a phase different from that of the positive polarity gradation data signal is output as the negative polarity gradation data signal based on the video signal. In the second output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with the same phase as that of the positive polarity gradation data signal is output as the negative polarity gradation data signal based on the video signal.

A data driver according to the disclosure is a data driver configured to generate and output a plurality of positive polarity gradation data signals having a positive polarity voltage value higher than a predetermined standard voltage and a plurality of negative polarity gradation data signals having a negative polarity voltage value lower than the standard voltage in response to a video signal. The data driver includes a control part. The control part executes either a first output mode or a second output mode, and switches from the first output mode to the second output mode or from the second output mode to the first output mode within a predetermined period at intervals of the predetermined period. In the first output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with a phase different from that of the positive polarity gradation data signal is output as the negative polarity gradation data signal based on the video signal. In the second output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with the same phase as that of the positive polarity gradation data signal is output as the negative polarity gradation data signal based on the video signal.

DESCRIPTION OF THE EMBODIMENTS

The disclosure provides a display apparatus and a data driver in which, in driving a display panel by column inversion driving, an image can be displayed with reduced flicker and image quality deterioration such as crosstalk.

In the disclosure, upon inversion of the polarity of a gradation data signal every one frame period based on a video signal and output of the same to each data line of a display panel by column inversion driving, a first output mode and a second output mode below are alternatively executed while being switched.

In the first output mode, a phase of a negative polarity gradation data signal is shifted in a direction of being delayed with respect to a positive polarity gradation data signal. Accordingly, even if rounding occurs at a rear edge of a gate selection signal applied to a gate line of the display panel, a difference between a pixel charging rate by the negative polarity gradation data signal and a pixel charging rate by the positive polarity gradation data signal can be reduced. Thus, according to the first output mode, it is possible to suppress flicker or image quality deterioration in association with the difference between the pixel charging rate by the negative polarity gradation data signal and the pixel charging rate by the positive polarity gradation data signal.

On the other hand, in the second output mode, the positive polarity gradation data signal and the negative polarity gradation data signal have the same phase. According to the second output mode, a difference occurs between the pixel charging rate by the negative polarity gradation data signal and the pixel charging rate by the positive polarity gradation data signal. However, since the positive polarity gradation data signal and the negative polarity gradation data signal have the same phase, crosstalk (streak unevenness) due to the different phases of the two gradation data signals in the first output mode does not occur.

Accordingly, by performing output of the gradation data signal in the first output mode and output of the gradation data signal in the second output mode alternately, a state in which crosstalk (streak unevenness) occurs and a state in which crosstalk does not occur are visually integrated in a time direction, and visually recognized crosstalk (streak unevenness) is reduced.

Accordingly, according to the disclosure, an image can be displayed with reduced flicker or image quality deterioration such as crosstalk (streak unevenness).

Figure 4:
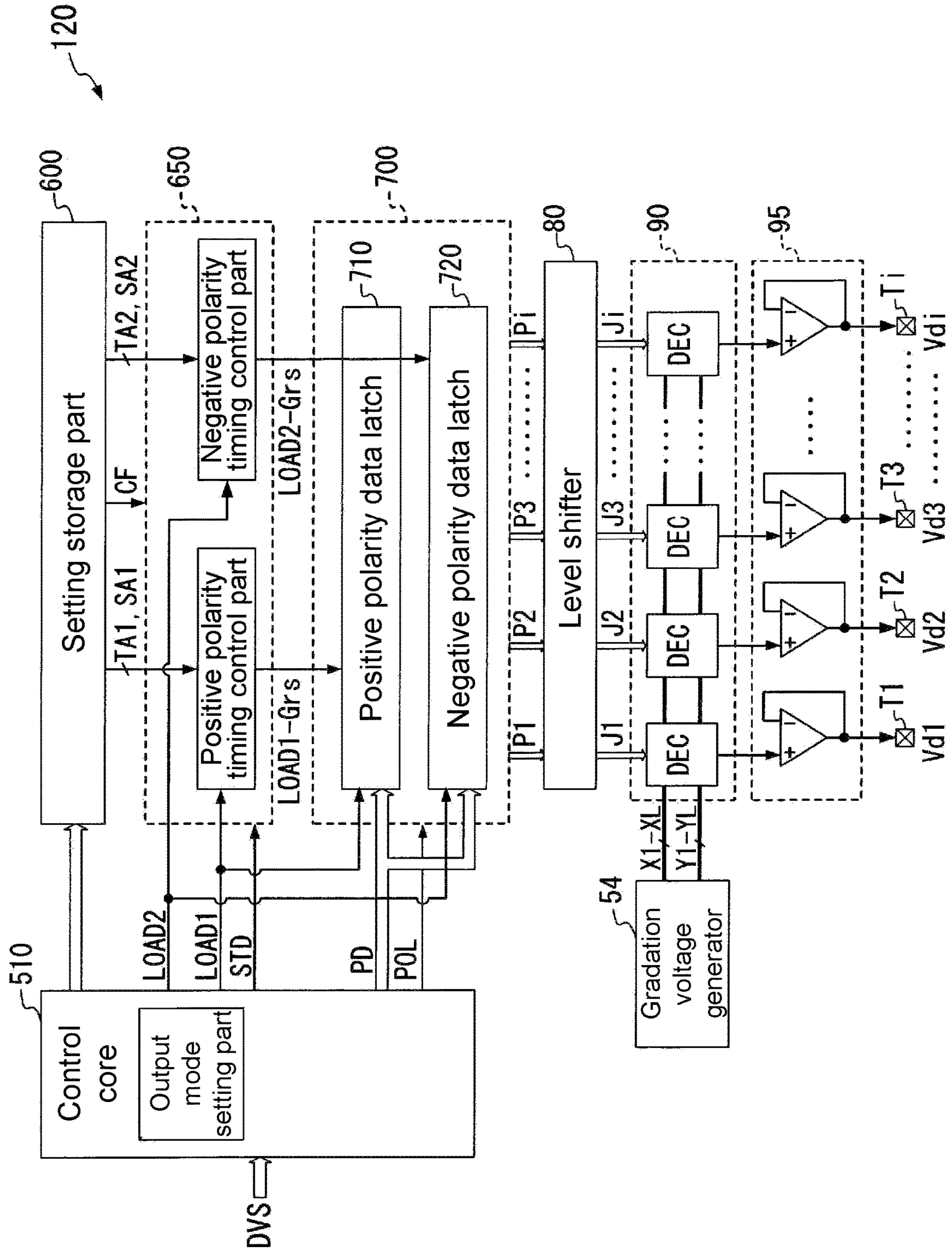
FIG. 4 is a block diagram showing a configuration of a data driver 120 according to the disclosure.

FIG. 4 is a block diagram showing an internal structure of the data driver 120 according to the disclosure, in which the data driver 120 drives a liquid crystal display panel according to a video signal.

The data driver 120 receives a video signal DVS in serial form, generates gradation data signals Vd1 to Vdi (i is an integer of 2 or more) corresponding to a luminance level of each pixel represented by the video signal DVS, and outputs each of them to the outside via output terminals T1 to Ti. The output terminals T1 to Ti are terminals for connecting to i data lines of a display panel.

The data driver 120 is formed of a semiconductor IC chip, and includes a gradation voltage generator 54, a level shifter 80, a decoder part 90, an output amplifier 95, a control core 510, a setting storage part 600, a timing control part 650, and a latch part 700.

The control core 510 performs deserialization, that is, serial-to-parallel conversion processing, on the video signal DVS in serial form. Through the serial-to-parallel conversion, the control core 510 extracts a series of video data PD, digital setting information, and a clock signal CLK from the video signal DVS. The digital setting information includes output delay direction information CF, output delay shift amount information SA1 and SA2, and output start timing information TA1 and TA2.

The output delay direction information CF is information as below designating an increasing direction of an output delay time with respect to each of first to i-th output channels that output the gradation data signals Vd1 to Vdi. That is, the output delay direction information CF is information designating whether to increase the output delay time of each of a positive polarity gradation data signal and a negative polarity gradation data signal in either ascending or descending order of the output channel number, or whether to increase the output delay time from both end sides toward the center of the i output channels. The output delay shift amount information SA1 is information indicating, as a delay shift amount when a positive polarity gradation data signal is output, a delay time taken for each output channel group obtained by dividing the first to i-th output channels into a plurality of groups from when a positive polarity gradation data signal corresponding to the leading output channel in the output channel group is output until a positive polarity gradation data signal corresponding to the last output channel is output. The output delay shift amount information SA2 is information indicating, as a delay shift amount when a negative polarity gradation data signal is output, a delay time taken for each of the above output channel group from when a negative polarity gradation data signal corresponding to the leading output channel in the output channel group is output until a negative polarity gradation data signal corresponding to the last output channel is output. The output start timing information TA1 is information designating an output timing of the leading channel with respect to an output channel group serving to output a positive polarity gradation data signal Vd. The output start timing information TA2 is information designating an output timing of the leading channel with respect to an output channel group serving to output a negative polarity gradation data signal Vd.

The control core 510 supplies the digital setting information (CF, SA1, SA2, TA1, and TA2) to the setting storage part 600 and supplies the series of video data PD to the latch part 700.

The control core 510 generates a binary (of logic level 0 or 1) polarity inversion signal POL that inverts the polarity of each gradation data signal output by the data driver 120 per frame period based on the video signal DVS, and supplies the same to the latch part 700.

The control core 510 generates a binary standard timing signal STD of one horizontal cycle (1H cycle) based on the video signal DVS, and supplies the same to the timing control part 650.

In response to the standard timing signal STD, the control core 510 takes a video signal for positive polarity into the latch part 700 every one horizontal scanning period, and generates an output timing signal LOAD1 indicating a timing of outputting the same. Furthermore, in response to the standard timing signal STD, the control core 510 takes a video signal for negative polarity into the latch part 700 every one horizontal scanning period, and generates an output timing signal LOAD2 indicating a timing of outputting the same. The output timing signals LOAD1 and LOAD2 are binary signals in which, for example, a pulse having a voltage value corresponding to logic level 0 and a pulse having a voltage value corresponding to logic level 1 alternately appear every one horizontal scanning period.

Figure 5A:
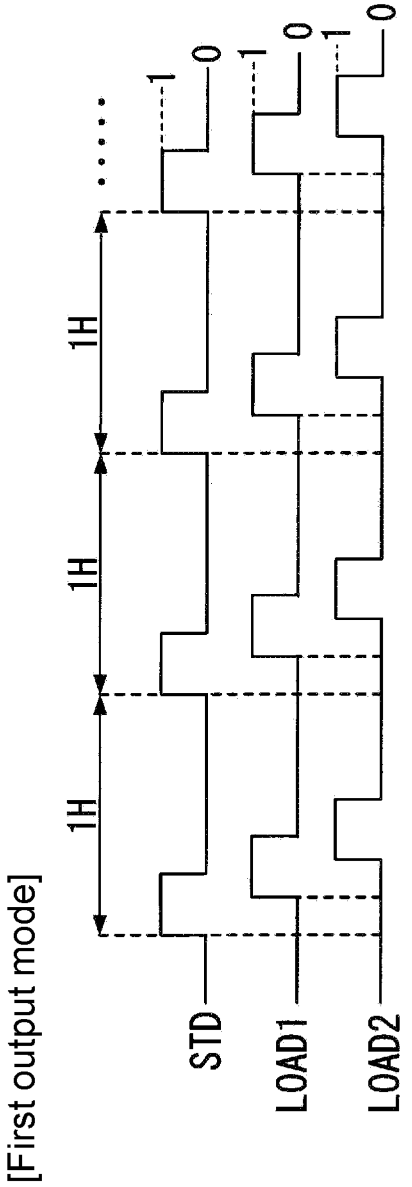
FIG. 5A is a waveform diagram showing an example of a form of output timing signals LOAD1 and LOAD2 in a first output mode.
Figure 5B:
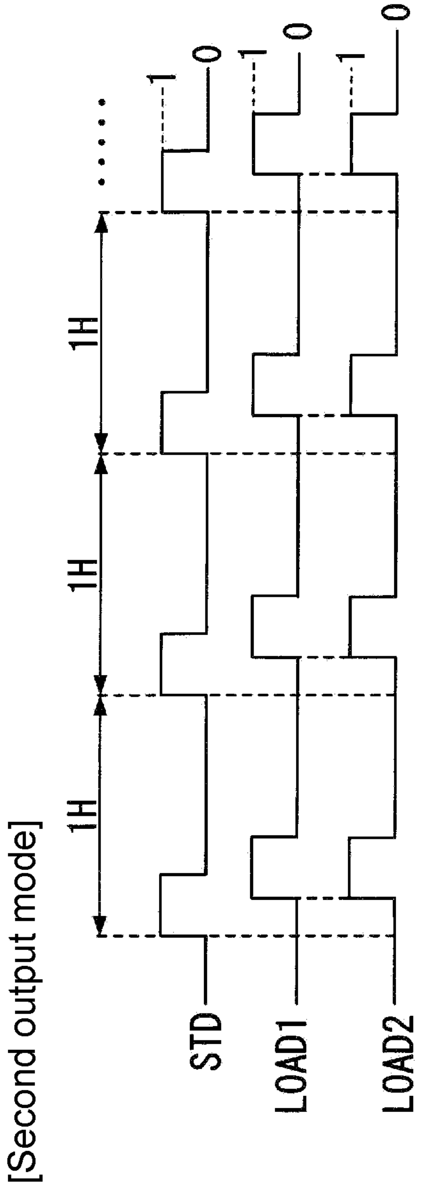
FIG. 5B is a waveform diagram showing an example of the form of the output timing signals LOAD1 and LOAD2 in a second output mode.

Here, the control core 510 includes an output mode setting part set to, in generating the output timing signals LOAD1 and LOAD2, the first output mode in which the phase of the output timing signal LOAD2 is delayed with respect to the output timing signal LOAD1 as shown in FIG. 5A or the second output mode in which the phases of the output timing signals LOAD1 and LOAD2 are matched as shown in FIG. 5B.

In the first output mode, the control core 510 has a function of adjusting a phase shift amount (that is, a time length) for delaying the phase of the output timing signal LOAD2 with respect to the output timing signal LOAD1 to any time length specified in advance.

The control core 510 supplies the output timing signals LOAD1 and LOAD2 generated by the output mode setting part to the timing control part 650 and the latch part 700.

The setting storage part 600 captures and stores the digital setting information (CF, SA1, SA2, TA1, and TA2) supplied from the control core 510. The setting storage part 600 supplies the stored digital setting information, that is, the output delay direction information CF, the output delay shift amount information SA1 and SA2 and the output start timing information TA1 and TA2, to the timing control part 650. The digital setting information stored in the setting storage part 600 is refreshed in every predetermined cycle.

The timing control part 650 includes functional blocks respectively for positive polarity and negative polarity, and generates a timing signal for outputting video data signals respectively for positive polarity and negative polarity that are taken into the latch part 700 described later.

That is, the functional block (positive polarity timing control part) for positive polarity of the timing control part 650 generates an output timing signal group LOAD1-Grs of a gradation data signal for positive polarity based on the output delay direction information CF, the output delay shift amount information SA1, the output start timing information TA1, the standard timing signal STD and the output timing signal LOAD1.

The functional block (negative polarity timing control part) for negative polarity of the timing control part 650 generates an output timing signal group LOAD2-Grs of a gradation data signal for negative polarity based on the output delay direction information CF, the output delay shift amount information SA2, the output start timing information TA2, the standard timing signal STD and the output timing signal LOAD2.

The output timing signal group LOAD1-Grs (LOAD2-Grs) is, for each of the above output channel group, a signal group representing an output timing of a gradation data signal corresponding to the output channel group. For example, the positive polarity timing control part generates the output timing signal group LOAD1-Grs indicating a timing delayed by a time based on the output delay direction information CF, the output delay shift amount information SA1 and the output start timing information TA1 from the output timing signal LOAD1 as a starting point. The negative polarity timing control part generates the output timing signal group LOAD2-Grs indicating a timing delayed by a time based on the output delay direction information CF, the output delay shift amount information SA2 and the output start timing information TA2 from the output timing signal LOAD2 as a starting point.

The timing control part 650 supplies the output timing signal groups LOAD1-Grs and LOAD2-Grs to the latch part 700.

The latch part 700 includes a positive polarity data latch 710 and a negative polarity data latch 720. The latch part 700 sorts each video data PD in the series of video data PD into those for positive polarity and those for negative polarity in response to the polarity inversion signal POL.

In response to the output timing signal LOAD1, the positive polarity data latch 710 captures each video data PD sorted for positive polarity. Based on the output timing signal group LOAD1-Grs corresponding to the corresponding output channel, the positive polarity data latch 710 outputs each of the captured video data PD for positive polarity as video data P at an output timing set for each predetermined output channel group.

In response to the output timing signal LOAD2, the negative polarity data latch 720 captures each video data PD sorted for negative polarity. Based on the output timing signal group LOAD2-Grs corresponding to the corresponding output channel, the negative polarity data latch 720 outputs each of the captured video data PD for negative polarity as video data P at an output timing set for each predetermined output channel group.

The latch part 700 supplies i (i is an integer of 2 or more) pieces of video data P output from the positive polarity data latch 710 and the negative polarity data latch 720 as video data P1 to Pi to the level shifter 80.

The level shifter 80 supplies, to the decoder part 90, video data J1 to Ji obtained by subjecting each of the i pieces of video data P1 to Pi supplied from the latch part 700 to level shift processing that increases a signal level (voltage amplitude) of the data.

The gradation voltage generator 54 generates L (L is an integer of 2 or more) voltages having different voltage values and higher than a standard voltage as a group of positive polarity reference voltages X1 to XL in which a pixel luminance level is represented in L stages. Furthermore, the gradation voltage generator 54 generates L voltages having different voltage values and lower than the standard voltage as a group of negative polarity reference voltages Y1 to YL in which the pixel luminance level is represented in L stages.

For example, the gradation voltage generator 54 divides voltages between a predetermined high potential VGH and a predetermined low potential VGL lower than the high potential VGH into a plurality of voltages by a ladder resistor, thereby generating the above groups of reference voltages X1 to XL and Y1 to YL.

The standard voltage is, for example, a voltage (hereinafter referred to as counter substrate voltage VCOM) applied to a counter substrate electrode disposed facing an electrode corresponding to each pixel in a display panel to be driven by the data driver 120.

The gradation voltage generator 54 supplies the group of positive polarity reference voltages X1 to XL and the group of negative polarity reference voltages Y1 to YL generated to the decoder part 90.

The decoder part 90 includes i decoders DEC that individually convert each of the video data J1 to Ji into a gradation data signal having an analog voltage value.

Each of the decoders DEC receives the group of positive polarity reference voltages X1 to XL and the group of negative polarity reference voltages Y1 to YL from the gradation voltage generator 54. Furthermore, each of the i decoders DEC individually receives one of the video data J1 to Ji.

Each decoder DEC, if the video data J received by the decoder DEC itself is positive polarity data, selects one or more reference voltages designated by the video data J from among the group of positive polarity reference voltages X1 to XL. On the other hand, if the video data J received by the decoder DEC itself is negative polarity data, the decoder DEC selects one or more reference voltages designated by the video data J from among the group of negative polarity reference voltages Y1 to YL.

The decoder part 90 outputs, to the output amplifier 95, one or more reference voltages selected by each decoder DEC as a gradation voltage corresponding to the luminance level of each pixel.

The output amplifier 95 includes i output amplifiers (op-amps) respectively corresponding to the i decoders DEC included in the decoder part 90. Each of the output amplifiers is a voltage follower whose output terminal and inverting input terminal (−) are connected together, and receives, by its non-inverting input terminal (+), one or more reference voltages supplied from its corresponding decoder DEC. By amplifying one or more reference voltages received by its non-inverting input terminal (+), each of the i output amplifiers generates a pulse voltage having a voltage value corresponding to the video data J as a gradation data pulse corresponding to the luminance level and outputs the same through the output terminal. The gradation data pulse is continuously output every one data period (for example, one horizontal scanning period) within one frame period. Each of the i output amplifiers outputs, as a gradation data signal Vd, a signal including a series of gradation data pulses appearing every one data period to the outside via the i output terminals T1 to Ti of the semiconductor IC. That is, the i gradation data signals Vd output from the i output amplifiers are supplied to the i data lines of the display panel respectively connected to the output terminals T1 to Ti.

The column inversion driving by the data driver 120 shown in FIG. 4 will be described in detail below.

Figure 6:
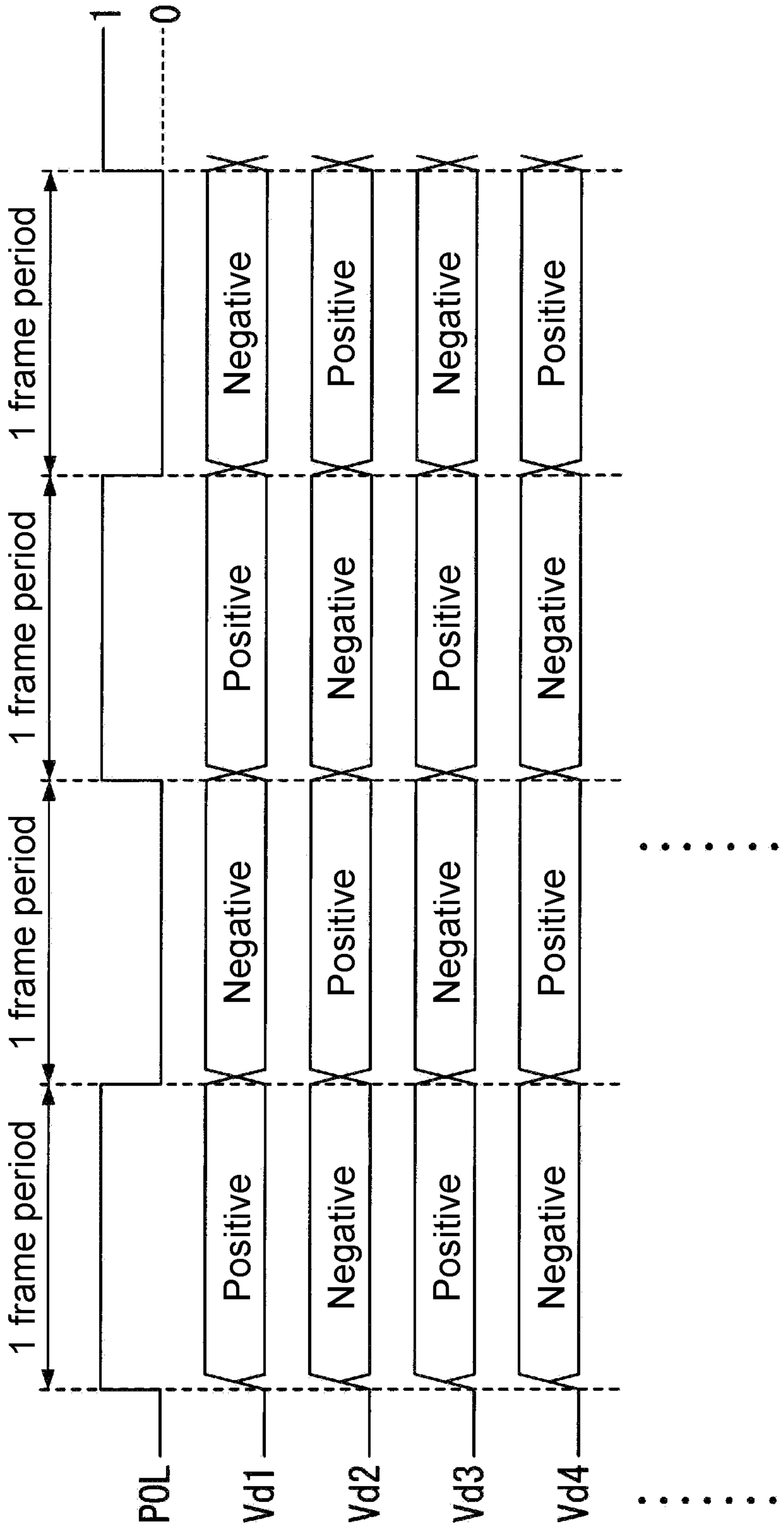
FIG. 6 is a time chart showing an example of transition of a polarity state (positive polarity or negative polarity) of each of gradation data signals Vd1 to Vd4 output from the data driver 120.

FIG. 6 is a time chart showing an example of a state (positive polarity or negative polarity) of each of the gradation data signals Vd1 to Vd4 output from, for example, the output terminals T1, T2, T3, and T4 of the data driver 120 by the column inversion driving.

As shown in FIG. 6, in one frame period during which the polarity inversion signal POL is logic level 1, each of the odd-numbered gradation data signals Vd1 and Vd3 among the gradation data signals Vd1 to Vd4 has positive polarity. In one frame period during which the polarity inversion signal POL is logic level 1, each of the even-numbered gradation data signals Vd2 and Vd4 among the gradation data signals Vd1 to Vd4 has negative polarity, as shown in FIG. 6.

As shown in FIG. 6, in one frame period during which the polarity inversion signal POL is logic level 0, each of the odd-numbered gradation data signals Vd1 and Vd3 among the gradation data signals Vd1 to Vd4 has negative polarity. In one frame period during which the polarity inversion signal POL is logic level 0, each of the even-numbered gradation data signals Vd2 and Vd4 among the gradation data signals Vd1 to Vd4 has positive polarity, as shown in FIG. 6.

Furthermore, in performing such column inversion driving, the data driver 120 controls consecutive N (N is an integer of 1 or more) frame periods in the video signal DVS to the first output mode shown in FIG. 5A, and controls consecutive M (M is an integer of 1 or more) frame periods to the second output mode shown in FIG. 5B. Furthermore, control is performed to alternately switch between the N frame periods controlled to the first output mode and the M frame periods controlled to the second output mode.

An output form of a gradation data signal in each of the first and second output modes will be described below with reference to a waveform diagram in the first output mode shown in FIG. 7 and a waveform diagram in the second output mode shown in FIG. 8.

Figure 7:
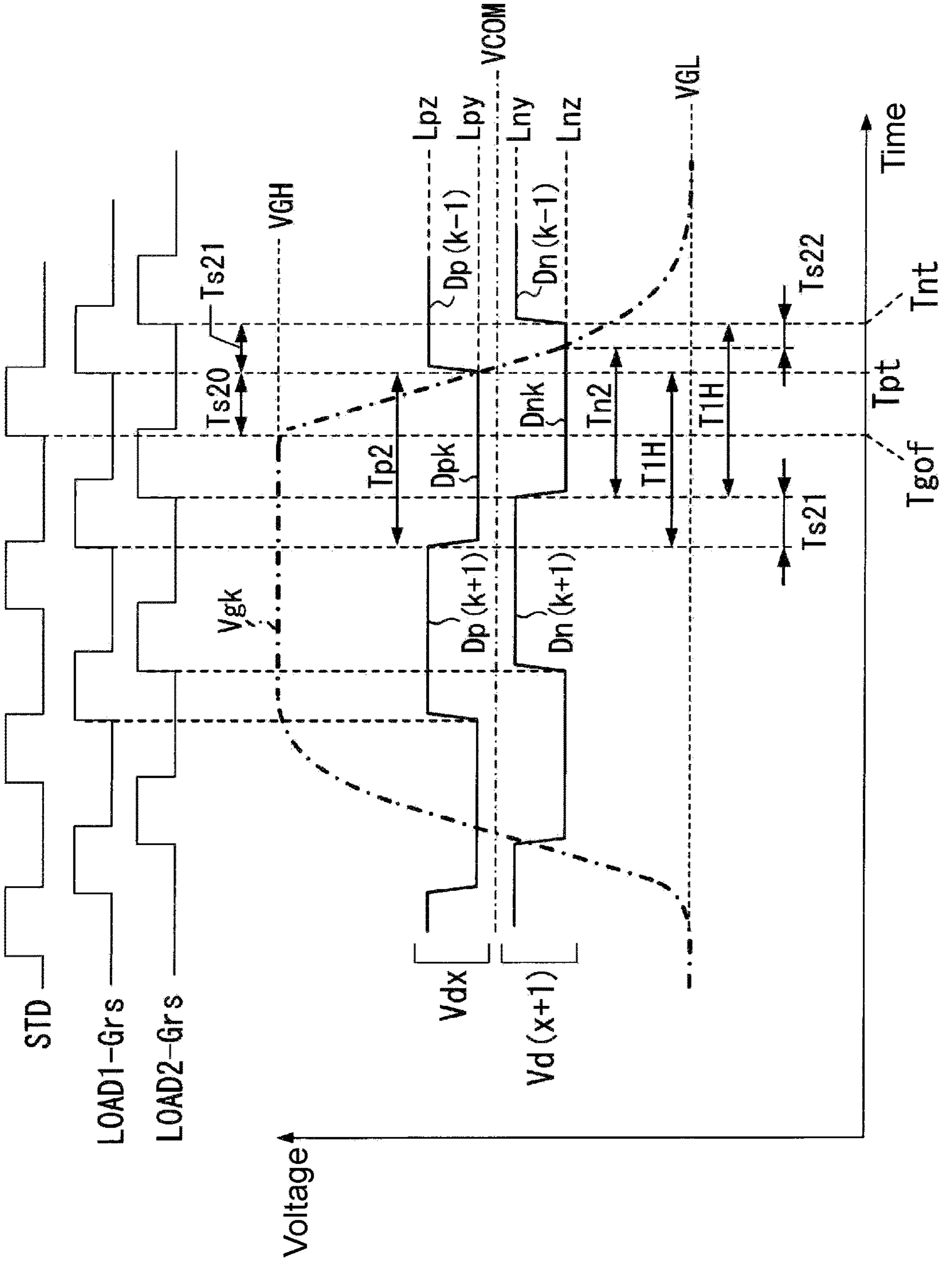
FIG. 7 is a waveform diagram showing an example of waveforms of the gate selection signal Vgk applied to a gate line and the positive polarity gradation data signal Vdx and the negative polarity gradation data signal Vd(x+1) applied to a pair of data lines in the first output mode.
Figure 8:
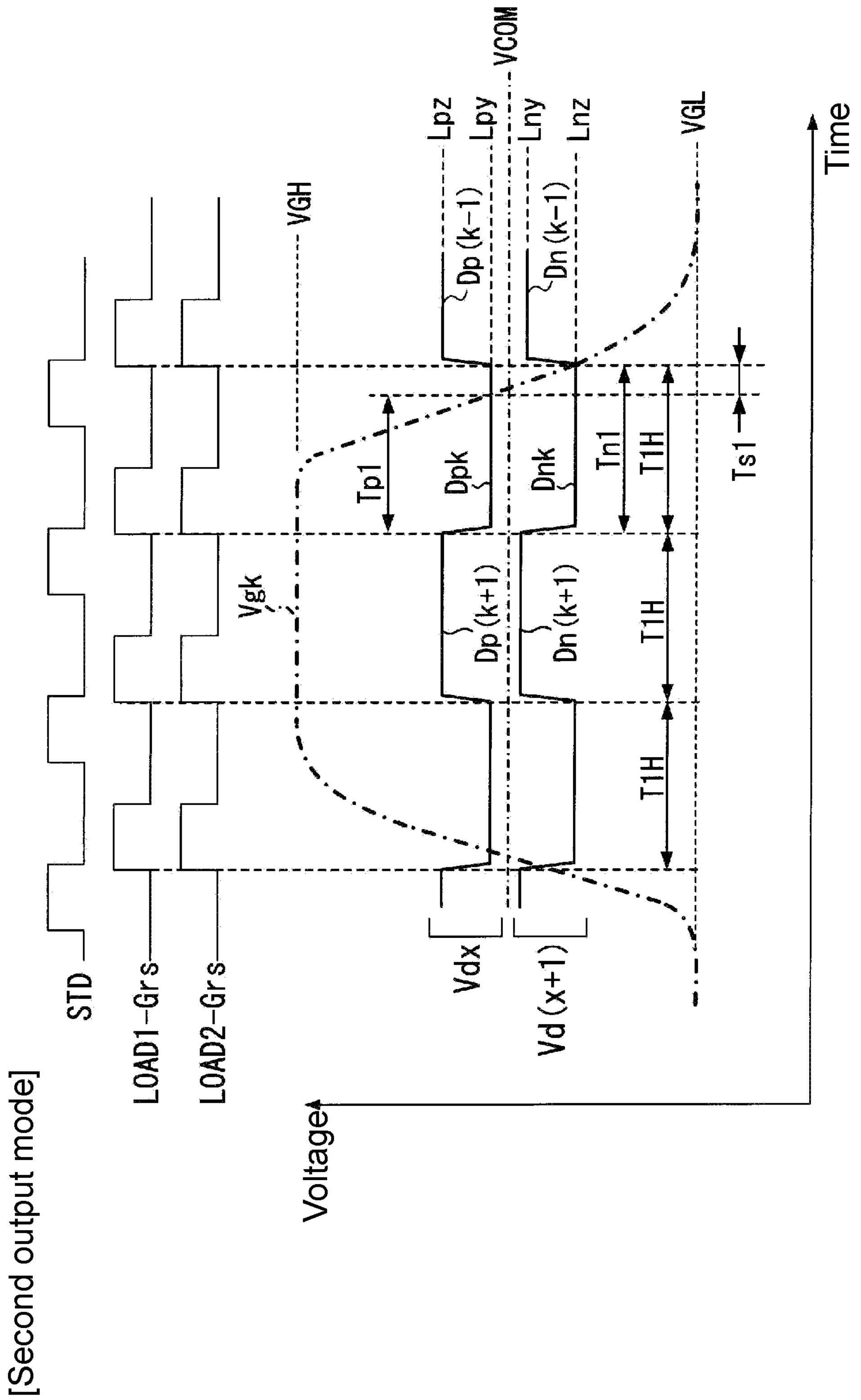
FIG. 8 is a waveform diagram showing an example of the waveforms of the gate selection signal Vgk applied to a gate line and the positive polarity gradation data signal Vdx and the negative polarity gradation data signal Vd(x+1) applied to a pair of data lines in the second output mode.

FIG. 7 and FIG. 8 show an example of a waveform of each of the positive polarity gradation data signal Vdx and the negative polarity gradation data signal Vd(x+1) applied to adjacent data lines DLx and DL(x+1) among the i data lines (hereinafter referred to as data lines DL1 to DLi) of the display panel connected to the data driver 120. Furthermore, in FIG. 7 and FIG. 8, a waveform of the gate selection signal Vgk applied to a gate line GLk disposed in a k-th (k is an integer of 1 to r, and r is an integer of 2 or more) place among r gate lines (hereinafter referred to as gate lines GL1 to GLr) disposed in the display panel is indicated by a dot-and-dash line. That is, in FIG. 7 and FIG. 8, a pulse waveform of the gate selection signal Vgk observed at the position of an intersection with the data lines DLx and DL(x+1) on the gate line GLk is shown.

As shown in FIG. 7 and FIG. 8, in the gate selection signal Vgk, relatively large waveform rounding occurs under the influence of a high impedance in association with a wiring length of a gate line from a gate driver. On this occasion, in the example shown in FIG. 7 and FIG. 8, it is assumed that the gate selection signal Vgk is subjected to a gate precharge in order to increase the pixel charging rate. That is, the gate selection signal Vgk, together with gradation data pulses Dpk and Dnk corresponding to display cells (pixels) in the k-th row, maintain the high potential VGH in an application period of the gradation data pulses Dp(k+1) and Dn(k+1) prior to the one data period corresponding to the display cells (pixels) in a (k+1)-th row.

FIG. 7 and FIG. 8 show the waveforms of the gate selection signal Vgk and the gradation data signal Vdx when writing (charging) based on the gradation data pulse Dpk included in the gradation data signal Vdx is performed on a pixel at an intersection of the data line DLx and the gate line GLk in response to the gate selection signal Vgk. FIG. 7 and FIG. 8 show the waveforms of the gate selection signal Vgk and the gradation data signal Vd(x+1) when writing (charging) based on the gradation data pulse Dnk included in the gradation data signal Vd(x+1) is performed on a pixel at an intersection of the data line DL(x+1) and the gate line GLk in response to the gate selection signal Vgk.

In FIG. 7 and FIG. 8, each of gradation data pulses Dp included in the positive polarity gradation data signal Vdx has a gradation voltage within the voltage range from the lower limit Lpy to the upper limit Lpz. Similarly, each of gradation data pulses Dn included in the negative polarity gradation data signal Vd(x+1) has a gradation voltage within the voltage range from the upper limit Lny to the lower limit Lnz. In FIG. 7 and FIG. 8, the counter substrate voltage VCOM is set between the lower limit Lpy of the positive polarity gradation data signal and the upper limit Lny of the negative polarity gradation data signal. In FIG. 7 and FIG. 8, for convenience of description, gradation data pulses included in the gradation data signals Vdx and Vd(x+1) exhibit a driving pattern in which the gradation voltages of the upper limit and the lower limit within the respective voltage ranges are alternately output every one data period.

[First Output Mode]

As shown in FIG. 7, in the first output mode, in response to the output timing signal groups LOAD1-Grs and LOAD2-Grs, the output timing of each of the gradation data signals Vdx and Vd(x+1) is controlled so that the timings of the positive polarity gradation data pulse Dpk and the negative polarity gradation data pulse Dnk are different from each other.

That is, in the first output mode, as shown in FIG. 7, the phase of the negative polarity gradation data pulse Dnk is delayed with respect to the positive polarity gradation data pulse Dpk by a predetermined phase shift amount.

Timing control of the positive polarity gradation data signal Vdx and the gate selection signal Vgk will be described below.

The data driver 120 sets the output timing of the positive polarity gradation data signal Vdx as follows so that a gradation data pulse Dp(k−1) in a data period next to the gradation data pulse Dpk is not supplied to a display cell (pixel) by the gate selection signal Vgk.

That is, as shown in FIG. 7, the data driver 120 outputs the positive polarity gradation data signal Vdx at a timing so that a potential of a rear edge of the gate selection signal Vgk becomes equal to or lower than the lower limit Lpy of the positive polarity gradation data pulse Dpk at a time of a rear edge of the gradation data pulse Dpk. For example, the phase of the positive polarity gradation data signal Vdx may be adjusted by the timing control part 650 so that such an output form is achieved.

Accordingly, an effective pixel charging period by the positive polarity gradation data pulse Dpk can be set to a pixel charging period Tp2 equivalent to one data period T1H, as shown in FIG. 7.

As shown in FIG. 7, the data driver 120 performs a phase shift in a direction of delaying the phase of the negative polarity gradation data signal Vd(x+1) by a time length Ts21 with respect to the phase of the positive polarity gradation data signal Vdx.

Accordingly, as shown in FIG. 7, the data driver 120 outputs the negative polarity gradation data signal Vd(x+1) synchronized with the output timing signal group LOAD2-Grs and having a phase shifted in a direction of being delayed by the time length Ts21 with respect to the positive polarity gradation data signal Vdx synchronized with the output timing signal group LOAD1-Grs. As a result, as shown in FIG. 7, at a time before a rear edge of the gradation data pulse Dnk included in the negative polarity gradation data signal Vd(x+1), the potential of the rear edge of the gate selection signal Vgk becomes equal to or lower than the lower limit Lpy of the gradation data pulse Dnk.

Thus, as shown in FIG. 7, the effective pixel charging period by the negative polarity gradation data pulse Dnk is a pixel charging period Tn2 shorter than one data period T1H by a time length Ts22 (0). An effect of the time length Ts22 is as follows.

Since a potential difference between the gate selection signal Vgk and a gradation data signal is larger in the negative polarity than in the positive polarity, the pixel charging rate is higher in the negative polarity in the same pixel charging period. Accordingly, the time length Ts22 is provided as a period for adjusting a difference in pixel charging rate between the positive polarity and the negative polarity in association with the potential difference between the gate selection signal Vgk and the gradation data signal.

That is, by the above driving, it is possible to secure a period equivalent to one data period T1H as the effective pixel charging period Tp2 by the positive polarity gradation data pulse Dpk and to reduce the effective pixel charging period Tn2 by the negative polarity gradation data pulse Dnk to be equal to or less than one data period T1H.

Figure 1:
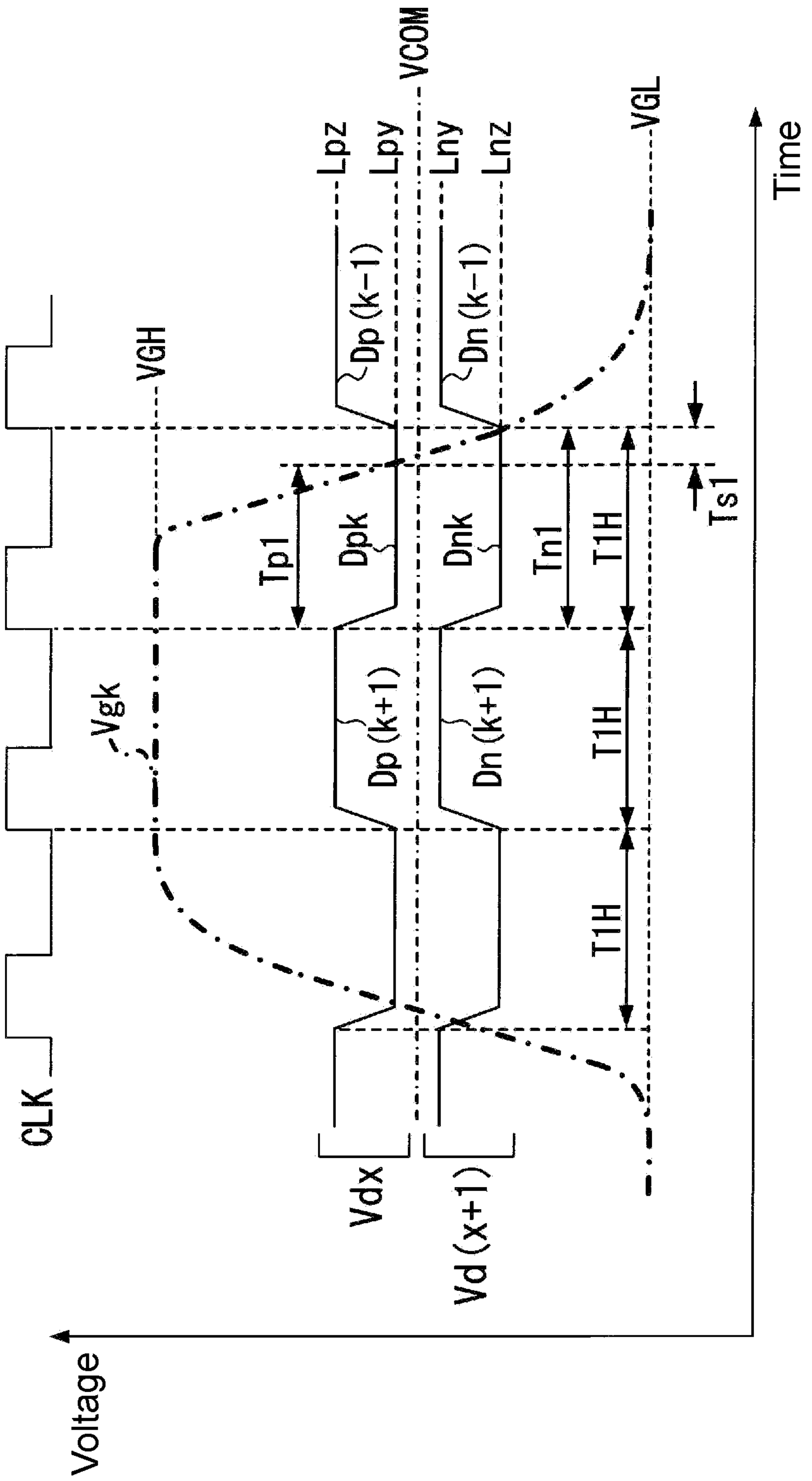
FIG. 1(Related Art)
FIG. 1 is a waveform diagram showing an example of waveforms of a gate selection signal applied to a gate line and positive polarity and negative polarity gradation data signals applied to a pair of adjacent data lines by conventional driving.

Accordingly, it is possible to make the pixel charging period Tp2 by the positive polarity gradation data pulse Dpk longer than the pixel charging period Tp1 shown in FIG. 1 and to make the pixel charging period Tn2 by the negative polarity gradation data pulse Dnk equal to or less than the pixel charging period Tn1 shown in FIG. 1.

In this way, by increasing the pixel charging rate by the positive polarity gradation data signal while adjusting the pixel charging rate by the negative polarity gradation data signal to be low, a difference between the pixel charging rate by the negative polarity gradation data signal and the pixel charging rate by the positive polarity gradation data signal is reduced.

Accordingly, even if rounding occurs at a pulse edge of the gate selection signal, it is possible to suppress flicker and image quality deterioration caused by the difference between the pixel charging rate by the negative polarity gradation data signal and the pixel charging rate by the positive polarity gradation data signal.

[Second Output Mode]

As shown in FIG. 8, in the second output mode, in response to the output timing signal groups LOAD1-Grs and LOAD2-Grs, the output timing of each of the gradation data signals Vdx and Vd(x+1) is controlled so that the timings of the positive polarity gradation data pulse Dpk and the negative polarity gradation data pulse Dnk are the same as each other.

Thus, according to the second output mode shown in FIG. 8, while there is a difference between the pixel charging rate by the negative polarity gradation data signal and the pixel charging rate by the positive polarity gradation data signal, since the positive polarity gradation data signal and the negative polarity gradation data signal have the same phase, crosstalk (streak unevenness) caused by different phases of the two gradation data signals in the first output mode does not occur.

Here, the data driver 120 outputs a gradation data signal according to the first output mode shown in FIG. 7 for consecutive N (N is an integer of 1 or more) frame periods, outputs a gradation data signal according to the second output mode shown in FIG. 8 for consecutive M (M is an integer of 1 or more) frame periods, and alternately switches between the N frame periods controlled to the first output mode and the M frame periods controlled to the second output mode.

Figure 2:
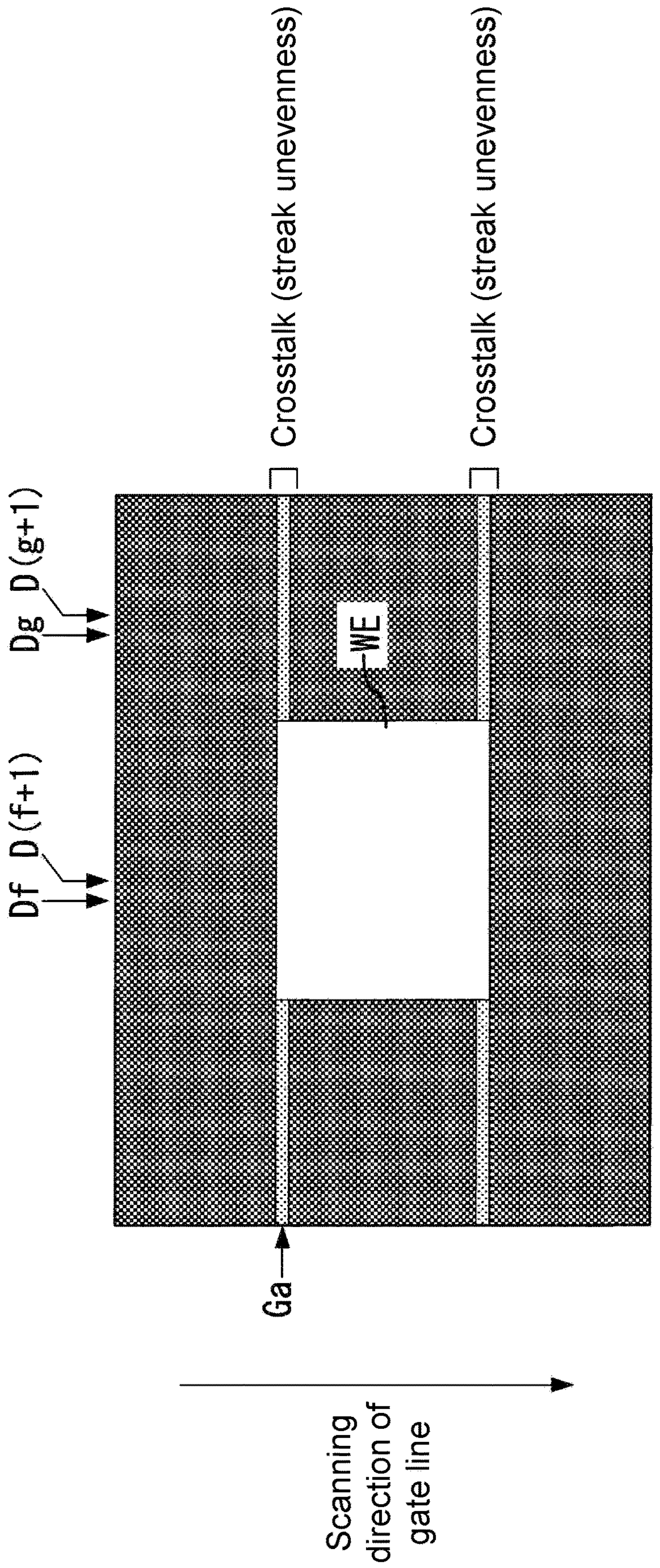
FIG.2(Related Art)
FIG. 2 illustrates an example of crosstalk (streak unevenness) appearing in an image with a gray background that includes a white square area in the center of a screen when the image is displayed.
Figure 3:
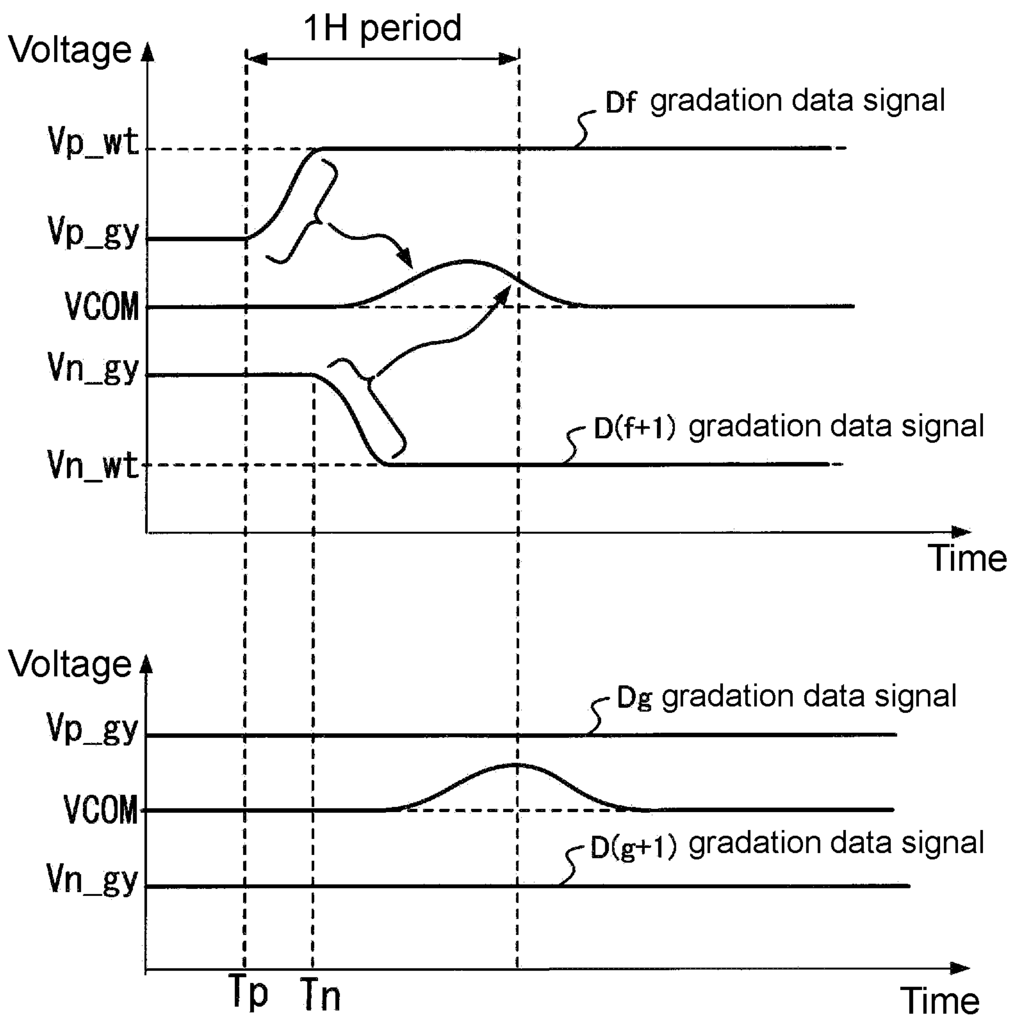
FIG. 3(Related Art)
FIG. 3 is a waveform diagram showing waveforms of a group of gradation data signals which, in order to display an image with a gray background that includes a white square area in the center of a screen, are respectively applied to a pair of data lines passing through the white square area and a pair of data lines not passing through the white square area, as well as a waveform of a counter substrate voltage.

Accordingly, since a state (first output mode) in which crosstalk (streak unevenness) as shown in FIG. 2 occurs and a state (second output mode) in which the crosstalk does not occur are visually integrated in the time direction, visually recognized crosstalk (streak unevenness) is reduced. By adjusting the numbers N and M of frame periods, it is possible to adjust a ratio of a control period in the first output mode and the second output mode and maximize the effect of reducing crosstalk (streak unevenness).

Accordingly, according to the data driver 120, it is possible to display an image with reduced flicker or image quality deterioration such as crosstalk (streak unevenness).

In the above embodiment, the data driver 120 uniformly sets all output channels in each frame to one of the first output mode and the second output mode. However, an output channel group set to the first output mode and an output channel group set to the second output mode may coexist in each frame.

That is, the i gradation data signals output from the output terminals T1 to Ti are divided into a first gradation data signal group and a second gradation data signal group. In each frame, the positive polarity gradation data signal and the negative polarity gradation data signal belonging to the first gradation data signal group are output in the first output mode, and the positive polarity gradation data signal and the negative polarity gradation data signal belonging to the second gradation data signal group are output in the second output mode. Furthermore, on this occasion, the output mode for outputting the first gradation data signal group and the output mode for outputting the second gradation data signal group are switched every N frames.

According to the above, as the data driver 120, one may be used which includes the following control part on the occasion of generating and outputting a plurality of positive polarity gradation data signals having a positive polarity voltage value higher than a predetermined standard voltage (VCOM) and a plurality of negative polarity gradation data signals having a negative polarity voltage value lower than the standard voltage in response to a video signal (DVS).

By executing either the following first output mode or the second output mode, and switching from the first output mode to the second output mode or from the second output mode to the first output mode within a predetermined period at intervals of the predetermined period, the control part (510, 650, 700) outputs a positive polarity gradation data signal and a negative polarity gradation data signal.

In the first output mode (FIG. 7), a signal in which a data pulse (Dp) having a positive polarity voltage value corresponding to a luminance level of each pixel appears in a predetermined cycle (T1H) is output as the positive polarity gradation data signal (Vdx) based on the video signal, and a signal in which a data pulse having a negative polarity voltage value corresponding to a luminance level of each pixel appears in the predetermined cycle with a phase different from that of the positive polarity gradation data signal is output as the negative polarity gradation data signal [Vd(x+1)] based on the video signal. On the other hand, in the second output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with the same phase as that of the positive polarity gradation data signal is output as the negative polarity gradation data signal based on the video signal.

Figure 9:
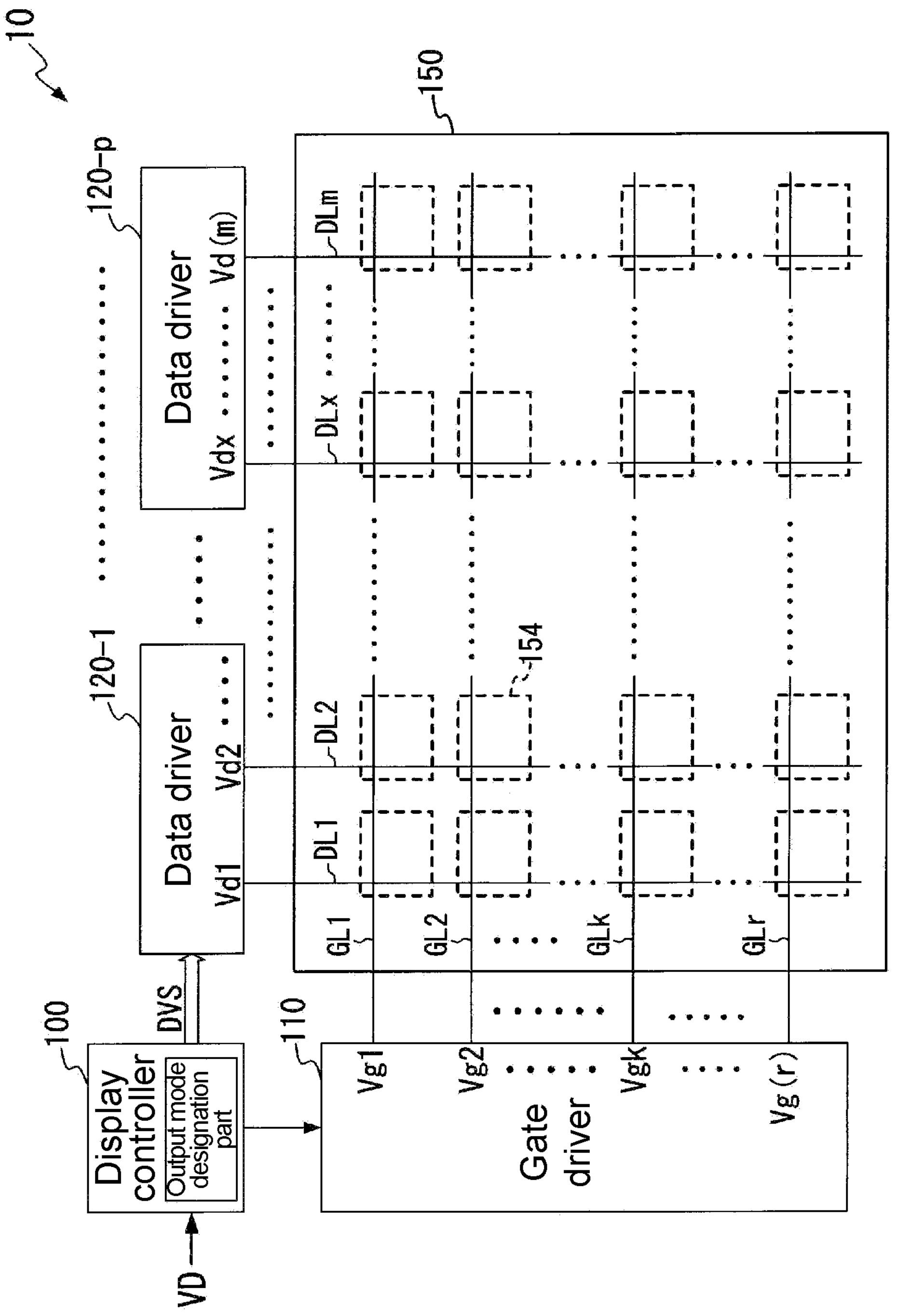
FIG. 9 is a block diagram showing an example of an internal configuration of the data driver 120.

FIG. 9 is a block diagram showing a configuration of a liquid crystal display 10 as a display apparatus according to the disclosure, the liquid crystal display 10 including the data driver 120 described above.

As shown in FIG. 9, the liquid crystal display 10 includes a display controller 100, a gate driver 110, data drivers 120-1 to 120-*p* (p is an integer of 2 or more) each being the data driver 120, and a display panel 150.

In the display panel 150, the gate lines GL1 to GLr (r is an integer of 2 or more) extending in a horizontal direction of a two-dimensional screen and the data lines DL1 to DLm (m is an integer of 2 or more) extending in a vertical direction of the two-dimensional screen are disposed intersecting each other. A display cell 154 serving as a unit pixel is formed at each intersection of the gate lines GL1 to GLr and the data lines DL1 to DLm. Here, the entire area where the data lines DL1 to DLm and the gate lines GL1 to GLr are disposed serves as a display screen of the display panel 150.

Figure 10:
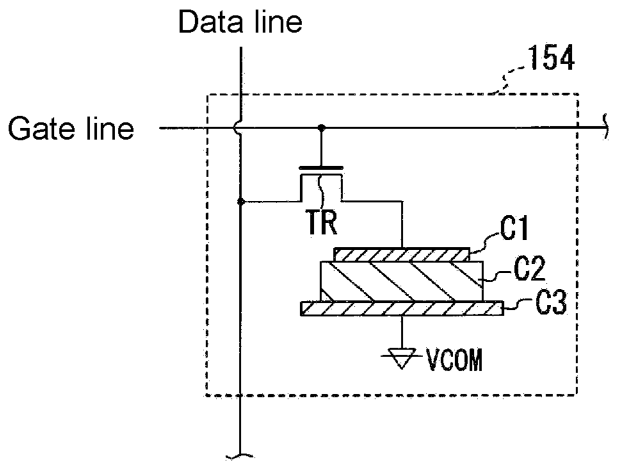
FIG. 10 schematically illustrates an example of a structure of a display cell 154.

FIG. 10 schematically illustrates a structure of the display cell 154.

As shown in FIG. 10, the display cell 154 includes a pixel electrode C1, a liquid crystal layer C2 and a counter substrate electrode C3 that are stacked together, and a thin film transistor TR as a pixel switch. FIG. 10 shows an example of an n-channel thin film transistor. The pixel electrode C1 is a transparent electrode provided independently for each display cell 154, and the counter substrate electrode C3 is a single transparent electrode covering the entire surface of the display panel 150. A control terminal of the thin film transistor TR is connected to a gate line GL, and a first terminal of the thin film transistor TR is connected to a data line DL. Furthermore, a second terminal of thin film transistor TR is connected to the pixel electrode C1. The counter substrate voltage VCOM as a standard voltage is applied to the counter substrate electrode C3.

The display controller 100 receives the video signal VD, and, based on the video signal VD, supplies to the gate driver 110 a gate timing signal indicating a timing of applying a gate selection signal to each of the gate lines GL1 to GLr.

Based on the video signal VD, the display controller 100 generates a clock signal and a series of video data PD indicating a luminance level of each pixel, and also generates the digital setting information as described above that corresponds to each of the data drivers 120-1 to 120-*p*. The display controller 100 includes an output mode designation part generating an output mode designation signal that designates which of the first output mode and the second output mode the output mode is to be set.

The display controller 100 supplies the video signal DVS including the clock signal, the series of video data PD, the digital setting information, and the output mode designation signal generated as above to the data drivers 120-1 to 120-*p*. In the liquid crystal display 10, in order to reduce the number of wires between the display controller 100 and each of the data drivers 120-1 to 120-*p*, the display controller 100 supplies the video signal DVS in the form of a serial signal to each data driver.

In response to the gate timing signal supplied from the display controller 100, the gate driver 110 generates gate selection signals Vg1 to Vg(r) (r is an integer of 2 or more) in order each including at least one pulse for selecting a gate line, and outputs each individually from each of the r output terminals. The gate driver 110 supplies the gate selection signals Vg1 to Vg(r) output from the r output terminals respectively to the gate lines GL1 to GLr of the display panel 150. In the example shown in FIG. 9, the gate driver 110 is disposed only on one end side of the gate lines GL1 to GLr of the display panel 150. However, a pair of gate drivers 110 may be disposed respectively on both end sides of the gate lines GL1 to GLr.

The data drivers 120-1 to 120-*p* are provided respectively corresponding to data line groups obtained by dividing the data lines DL1 to DLm of the display panel 150 into a first to p-th data line groups each consisting of i data lines adjacent to each other. Each of the output terminals T1 to Ti is connected to the i data lines belonging to the corresponding data line group.

As shown in FIG. 9, the data driver 120-1 is connected to the data lines DL1 to DLi serving to drive a plurality of display cells 154 disposed in an area on each of the gate lines GL1 to GLr of the display panel 150 where the wiring length from the output terminal of the gate driver 110 is relatively short. As shown in FIG. 9, the data driver 120-*p* is connected to the data lines DLx (x is 2 or more) to DLm serving to drive a plurality of display cells 154 disposed in an area on each of the gate lines GL1 to GLr of the display panel 150 where the wiring length from the output terminal of the gate driver 110 is relatively long.

By such a configuration, the data drivers 120-1 to 120-*p* capture the series of video data PD included in the video signal DVS in an amount (m pieces) corresponding to one horizontal scanning line at a time, and converts each video data PD into a gradation data signal having an analog voltage value corresponding to a luminance level. The data drivers 120-1 to 120-*p* supply the generated gradation data signals Vd1 to Vd(m) respectively to the data lines DL1 to DLm of the display panel 150.

Here, based on the output mode designation signal and the digital setting information supplied from the display controller 100, the output mode setting part of each of the data drivers 120-1 to 120-*p* individually sets each data driver to the first output mode or the second output mode.

Figure 11:
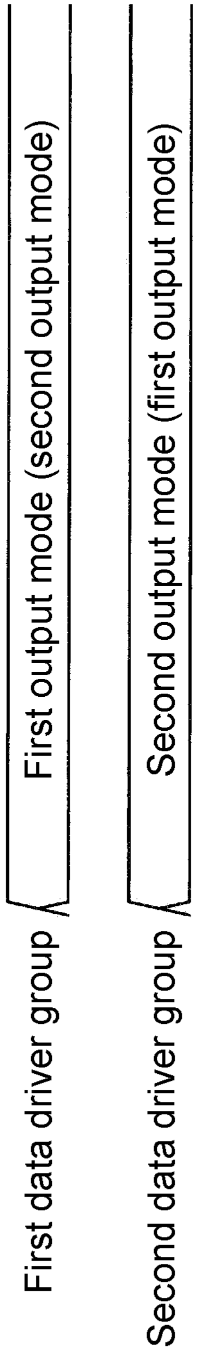
FIG. 11 illustrates an example of a setting form of an output mode with respect to a first data driver group and a second data driver group.

For example, in the liquid crystal display 10, the data drivers 120-1 to 120-*p* are divided into a first data driver group and a second data driver group. As shown in FIG. 11, each data driver belonging to the first data driver group is set to the first output mode, and each data driver belonging to the second data driver group is set to the second output mode. That is, by coexistence of an area driven in the first output mode and an area driven in the second output mode within one frame of the display panel 150, a fluctuation amount of the counter substrate voltage VCOM in the display pattern in which crosstalk as shown in FIG. 2 is likely to be visually recognized is suppressed.

Figure 12:
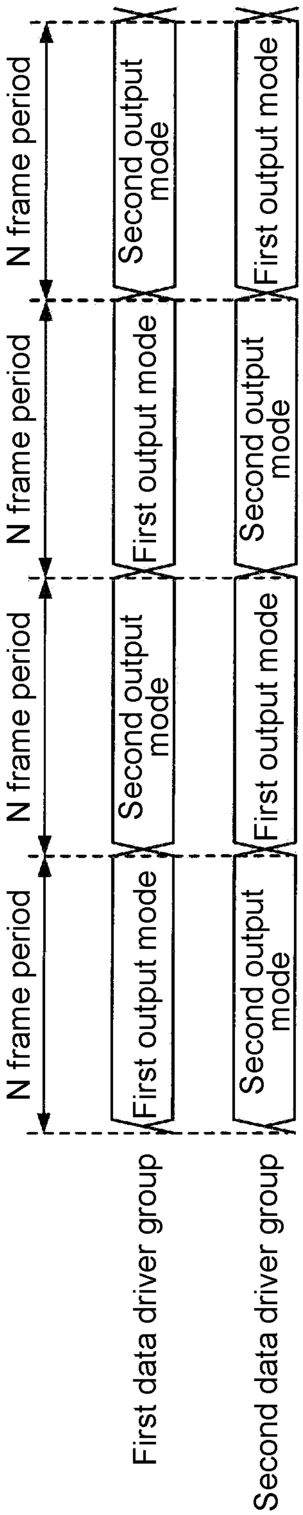
FIG. 12 illustrates another example of the setting form of the output mode with respect to the first data driver group and the second data driver group.

One of the first output mode and the second output mode respectively set for the first data driver group and the second data driver group may be switched to the other output mode every N (N is an integer of 2 or more) frame periods, as shown in FIG. 12. The allocation of the data drivers 120-1 to 120-*p* divided into the first data driver group and the second data driver group may be changed every N frame periods.

In the liquid crystal display 10, whether in the first or second output mode, a delay time of an output timing with a time when the standard timing signal STD rises (or falls) as a starting point in the output timing signal group LOAD1-Grs indicating the output timing of the positive polarity gradation data signal Vd is controlled for each of the data drivers 120-1 to 120-*p*.

The data driver 120-1 and the data driver 120-*p* are selected from the data drivers 120-1 to 120-*p*, and the output timing signal groups LOAD1-Grs and LOAD2-Grs generated by each of them will be described below. As shown in FIG. 9, the data driver 120-1 is disposed closest to the gate driver 110 and the data driver 120-*p* is disposed farthest from the gate driver 110.

Figure 13A:
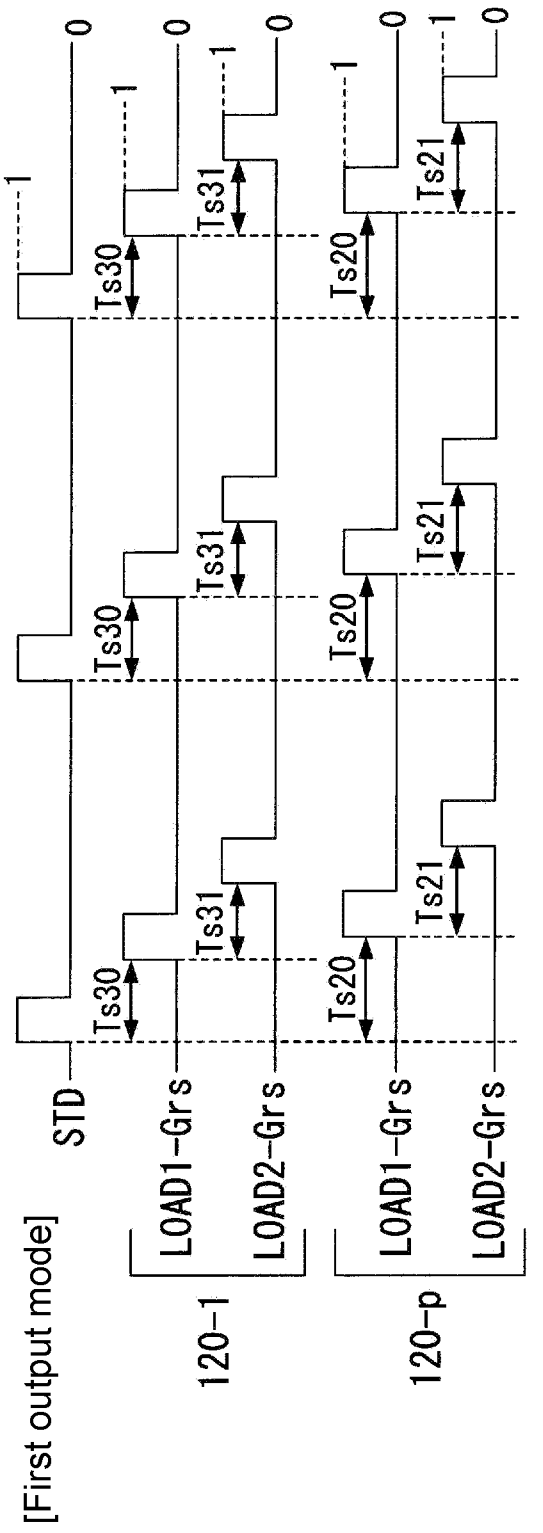
FIG. 13A is a waveform diagram showing a form of output timing signal groups LOAD1-Grs and LOAD2-Grs generated in the first output mode.
Figure 13B:
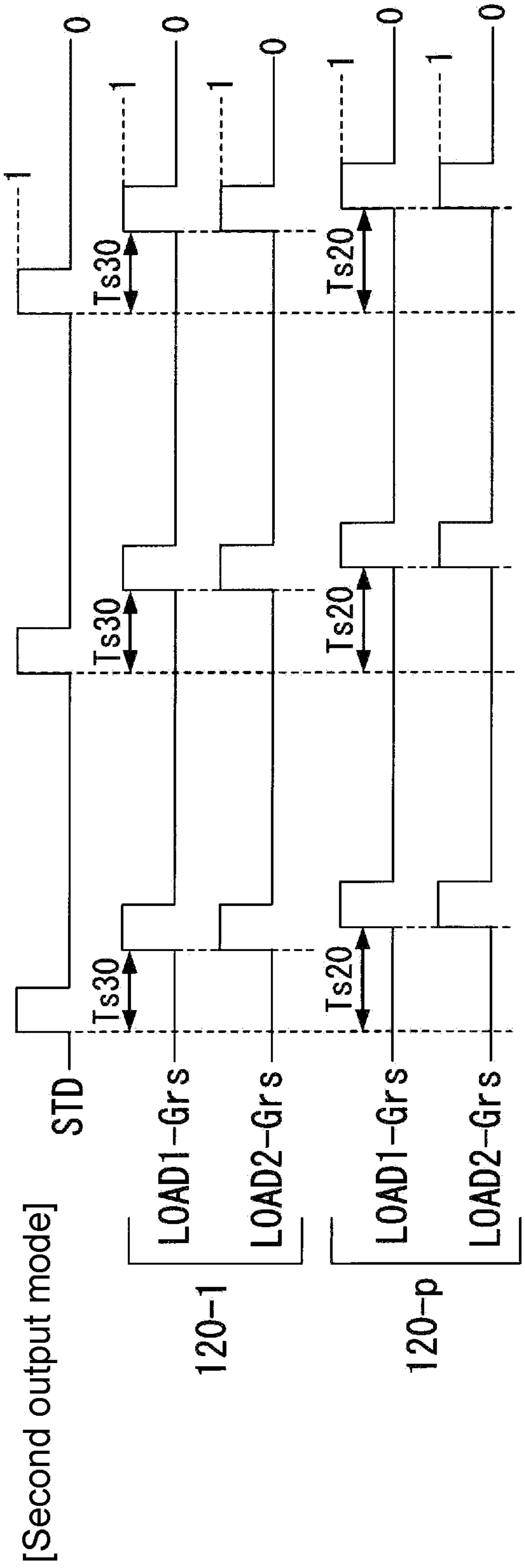
FIG. 13B is a waveform diagram showing a form of the output timing signal groups LOAD1-Grs and LOAD2-Grs generated in the second output mode.

FIG. 13A is a time chart showing timings of the output timing signal groups LOAD1-Grs and LOAD2-Grs of each of the data drivers 120-1 and 120-*p* in the first output mode. FIG. 13B is a time chart showing timings of the output timing signal groups LOAD1-Grs and LOAD2-Grs of each of the data drivers 120-1 and 120-*p* in the second output mode.

As shown in FIG. 13A and FIG. 13B, in the data driver 120-1, the timing control part 650 supplies to the positive polarity data latch 710 the output timing signal group LOAD1-Grs in which, each time the standard timing signal STD rises, a pulse indicating an output timing appears at a time when a time length Ts30 has elapsed from the time when the standard timing signal STD rises. On the other hand, in the data driver 120-*p*, the timing control part 650 supplies to the positive polarity data latch 710 the output timing signal group LOAD1-Grs in which, each time the standard timing signal STD rises, a pulse indicating an output timing appears at a time when a time length Ts20 has elapsed from the time when the standard timing signal STD rises. On this occasion, the time length Ts20 is longer than the time length Ts30 in the data driver 120-1.

As shown in FIG. 13A, in the first output mode, the timing control part 650 of the data driver 120-1 supplies to the negative polarity data latch 720 the output timing signal group LOAD2-Grs in which a pulse indicating an output timing appears at a time when a time length Ts31 has elapsed from each pulse in the output timing signal group LOAD1-Grs. In the first output mode, the timing control part 650 of the data driver 120-*p* supplies to the negative polarity data latch 720 the output timing signal group LOAD2-Grs in which a pulse indicating an output timing appears at a time when the time length Ts21 has elapsed from each pulse in the output timing signal group LOAD1-Grs.

That is, compared to the data driver 120-1, the data driver 120-*p* has a longer wiring length of each gate line wired from a data line group to be driven by the data driver 120-*p* itself to an output terminal group of the gate driver 110. Thus, a falling (rising) time of the gate selection signal Vgk observed at the display cell 154 connected to the data line group (DLx to DLm) to be driven by the data driver 120-*p* is longer as compared to the data line group (DL1 to DLi) to be driven by the data driver 120-1.

Accordingly, in the liquid crystal display 10, whether in the first or second output mode, to follow the falling (rising) time of the gate selection signal Vgk like this, the output timing of a gradation data signal output from the data driver 120-*p* is controlled to be later than the output timing of a gradation data signal output from the data driver 120-1. Specifically, the time length Ts20 (Ts21) of the output timing signal group LOAD1-Grs (LOAD2-Grs) generated by the data driver 120-*p* is controlled to be longer than the time length Ts30 (Ts31) of the output timing signal group LOAD1-Grs (LOAD2-Grs) generated by the data driver 120-1.

Furthermore, the time length Ts31 of a phase shift in a delay direction of a negative polarity gradation data signal with respect to a positive polarity gradation data signal output from the data driver 120-1 is shorter than the time length Ts21 of a phase shift in a delay direction of a negative polarity gradation data signal with respect to a positive polarity gradation data signal output from the data driver 120-*p*. That is, in the liquid crystal display 10, each data driver 120 is set so that, the shorter the wiring length of the gate line wired from the data line that receives the gradation data signal to the output terminal of the gate driver 110, the shorter the time length of the phase shift of the negative polarity gradation data signal with respect to the positive polarity gradation data signal.

By adjusting the output timing of the positive polarity and negative polarity gradation data signals described above, in the liquid crystal display 10, a fluctuation in the pixel charging rate in association with a difference in wiring length of the gate line from the output terminal of the gate driver 110 to each pixel is suppressed.

In the above embodiment, the output mode designation part of the display controller 100 controls each data driver 120-1 to 120-*p* to be set to the first or second output mode along a fixed or predetermined sequence as shown in FIG. 11 or FIG. 12.

However, the display controller 100 may control the data drivers 120-1 to 120-*p* to be set to the first or second output mode for each of a plurality of areas dividing each frame based on the video signal VD.

What is claimed is:

1. A display apparatus, comprising:

a display panel, comprising a plurality of data lines comprising a first data line group and a second data line group, and a plurality of gate lines disposed intersecting the plurality of data lines;

a gate driver, supplying a gate selection signal to each of the plurality of gate lines; and a plurality of data drivers, provided for each predetermined number of data lines, each generating a positive polarity gradation data signal higher than a predetermined standard voltage and a negative polarity gradation data signal lower than the standard voltage in response to a video signal, and alternately and repeatedly executing an operation of supplying the positive polarity gradation data signal to the first data line group and supplying the negative polarity gradation data signal to the second data line group and an operation of supplying the positive polarity gradation data signal to the second data line group and supplying the negative polarity gradation data signal to the first data line group, wherein each of the plurality of data drivers comprises:

a control part, executing either a first output mode or a second output mode, and switching from the first output mode to the second output mode or from the second output mode to the first output mode within a predetermined period at intervals of the predetermined period, wherein, in the first output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with a phase different from that of the positive polarity gradation data signal is output as the negative polarity gradation data signal based on the video signal, and in the second output mode, the signal in which a data pulse having the positive polarity voltage value corresponding to the luminance level of each pixel appears in the predetermined cycle is output as the positive polarity gradation data signal based on the video signal, and the signal in which a data pulse having the negative polarity voltage value corresponding to a luminance level of each pixel appears in the predetermined cycle with the same phase as that of the positive polarity gradation data signal is output as the negative polarity gradation data signal based on the video signal, wherein the negative polarity gradation data signal in the first output mode is shifted in a direction of being delayed with respect to the phase of the positive polarity gradation data signal, and the control part reduces a time length of the phase shift of the negative polarity gradation data signal with respect to the positive polarity gradation data signal as a wiring length of the plurality of gate lines wired from the plurality of data lines that receive the gradation data signals to an output terminal of the gate driver is reduced.

2. The display apparatus according to claim 1, wherein the control part has a function of adjusting the time length of the phase shift.

3. The display apparatus according to claim 1, wherein the control part controls N frame periods in the video signal to the first output mode, controls M frame periods in the video signal to the second output mode, and controls the N frame periods and the M frame periods to be switched alternately, wherein N and M are each an integer of 1 or more.

4. The display apparatus according to claim 1, wherein the control part divides all of the gradation data signals to be output to the first data line group and the second data line group into a first gradation data signal group and a second gradation data signal group, outputs the positive polarity gradation data signal and the negative polarity gradation data signal belonging to the first gradation data signal group in the first output mode in each frame, and outputs the positive polarity gradation data signal and the negative polarity gradation data signal belonging to the second gradation data signal group in the second output mode in each frame.

5. The display apparatus according to claim 1, wherein, in each frame in the video signal, the control part comprised in at least one of the plurality of data drivers executes one of the first output mode and the second output mode, and the control part comprised in another one of the plurality of data drivers executes the other of the first output mode and the second output mode.

6. The display apparatus according to claim 4, wherein the control part switches the first output mode and the second output mode from one state to another state or from the another state to the one state every N frame periods in the video signal, wherein N is an integer of 1 or more.

7. The display apparatus according to claim 1, further comprising:

a display controller, superimposing an output mode designation signal that designates the first output mode or the second output mode on the video signal and supplying the same to the plurality of data drivers.

8. A data driver, configured to generate and output a plurality of positive polarity gradation data signals having a positive polarity voltage value higher than a predetermined standard voltage and a plurality of negative polarity gradation data signals having a negative polarity voltage value lower than the standard voltage in response to a video signal, the data driver comprising:

a control part, executing either a first output mode or a second output mode, and switching from the first output mode to the second output mode or from the second output mode to the first output mode within a predetermined period at intervals of the predetermined period, wherein, in the first output mode, a signal in which a data pulse having a positive polarity voltage value corresponding to a luminance level of each pixel appears in a predetermined cycle is output as the positive polarity gradation data signal based on the video signal, and a signal in which a data pulse having a negative polarity voltage value corresponding to a luminance level of each pixel appears in the predetermined cycle with a phase different from that of the positive polarity gradation data signal is output as the negative polarity gradation data signal based on the video signal, and in the second output mode, the signal in which a data pulse having the positive polarity voltage value corresponding to the luminance level of each pixel appears in the predetermined cycle is output as the positive polarity gradation data signal based on the video signal, and the signal in which a data pulse having the negative polarity voltage value corresponding to a luminance level of each pixel appears in the predetermined cycle with the same phase as that of the positive polarity gradation data signal is output as the negative polarity gradation data signal based on the video signal, wherein the negative polarity gradation data signal in the first output mode is shifted in a direction of being delayed with respect to the phase of the positive polarity gradation data signal, and wherein the control part reduces a time length of the phase shift of the negative polarity gradation data signal with respect to the positive polarity gradation data signal as a wiring length of a gate line wired from a data line that receives the gradation data signals to an output terminal of a gate driver is reduced.

9. The data driver according to claim 8, wherein the control part has a function of adjusting the time length of the phase shift.

10. The data driver according to claim 8, wherein the control part controls N frame periods in the video signal to the first output mode, controls M frame periods in the video signal to the second output mode, and controls the N frame periods and the M frame periods to be switched alternately, wherein N and M are each an integer of 1 or more.

11. The data driver according to claim 8, wherein the control part divides all of the gradation data signals to be output to a first data line group and a second data line group into a first gradation data signal group and a second gradation data signal group, outputs the positive polarity gradation data signal and the negative polarity gradation data signal belonging to the first gradation data signal group in the first output mode in each frame, and outputs the positive polarity gradation data signal and the negative polarity gradation data signal belonging to the second gradation data signal group in the second output mode in each frame.

* * * * *